(12) United States Patent
Kanno

(10) Patent No.: US 10,782,903 B2
(45) Date of Patent: *Sep. 22, 2020

(54) MEMORY SYSTEM AND METHOD FOR CONTROLLING NONVOLATILE MEMORY

(71) Applicant: Toshiba Memory Corporation, Minato-ku, Tokyo (JP)

(72) Inventor: Shinichi Kanno, Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,603

(22) Filed: May 20, 2019

(65) Prior Publication Data

US 2019/0278502 A1 Sep. 12, 2019

Related U.S. Application Data

(63) Continuation of application No. 15/820,494, filed on Nov. 22, 2017, now Pat. No. 10,338,839.

(30) Foreign Application Priority Data

Jun. 28, 2017 (JP) ................. 2017-126594

(51) Int. Cl.
*G06F 12/00* (2006.01)
*G06F 3/06* (2006.01)

(52) U.S. Cl.
CPC .......... *G06F 3/0634* (2013.01); *G06F 3/0604* (2013.01); *G06F 3/064* (2013.01); *G06F 3/065* (2013.01); *G06F 3/0611* (2013.01); *G06F 3/0631* (2013.01); *G06F 3/0644* (2013.01); *G06F 3/0652* (2013.01); *G06F 3/0659* (2013.01); *G06F 3/0688* (2013.01)

(58) Field of Classification Search
None
See application file for complete search history.

(56) References Cited

U.S. PATENT DOCUMENTS 8,286,883 B2 * 10/2012 Asnaashari ......... G06F 12/1425
                                                          235/492
2010/0250826 A1 ‡ 9/2010 Jeddeloh ............. G06F 13/1684
                                                          711/103

(Continued)

FOREIGN PATENT DOCUMENTS

JP    2017-27387 A  ‡  2/2017
JP    2017-27387 A     2/2017

*Primary Examiner* — Baboucarr Faal
(74) *Attorney, Agent, or Firm* — White & Case LLP

(57) ABSTRACT

According to one embodiment, a memory system includes a nonvolatile memory including a plurality of nonvolatile memory dies, and a controller. The controller classifies the nonvolatile memory dies into a plurality of physical sets such that each of the nonvolatile memory dies belongs to only one physical set. The controller creates a plurality of storage regions which share each of the physical sets and each of which spans the physical sets. The controller sets one of the physical sets to a first mode for permitting a write operation and a read operation, and sets each of the other physical sets to a second mode for permitting a read operation and inhibiting a write operation.

17 Claims, 28 Drawing Sheets

(56) References Cited

U.S. PATENT DOCUMENTS

| | | | |
|---|---|---|---|
| 2016/0124842 A1‡ | 5/2016 | Kanno | G06F 12/0246 |
| | | | 711/10 |
| 2016/0170903 A1‡ | 6/2016 | Kanno | G06F 12/0246 |
| | | | 711/10 |
| 2017/0024137 A1‡ | 1/2017 | Kanno | G06F 3/0604 |
| 2017/0068456 A1‡ | 3/2017 | Toge | G06F 3/0605 |

\* cited by examiner
‡ imported from a related application

F.I.G. 2

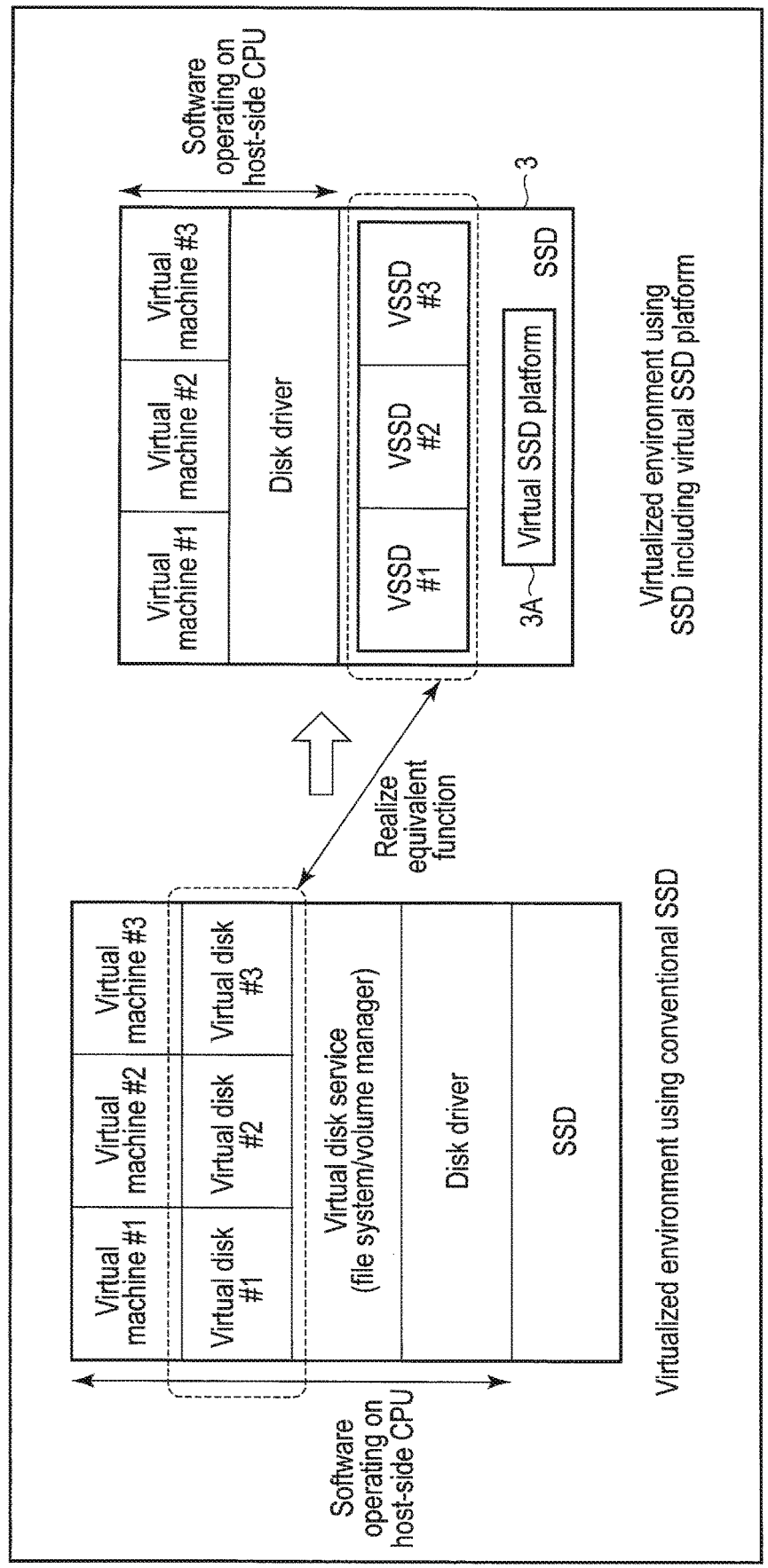
F I G. 3

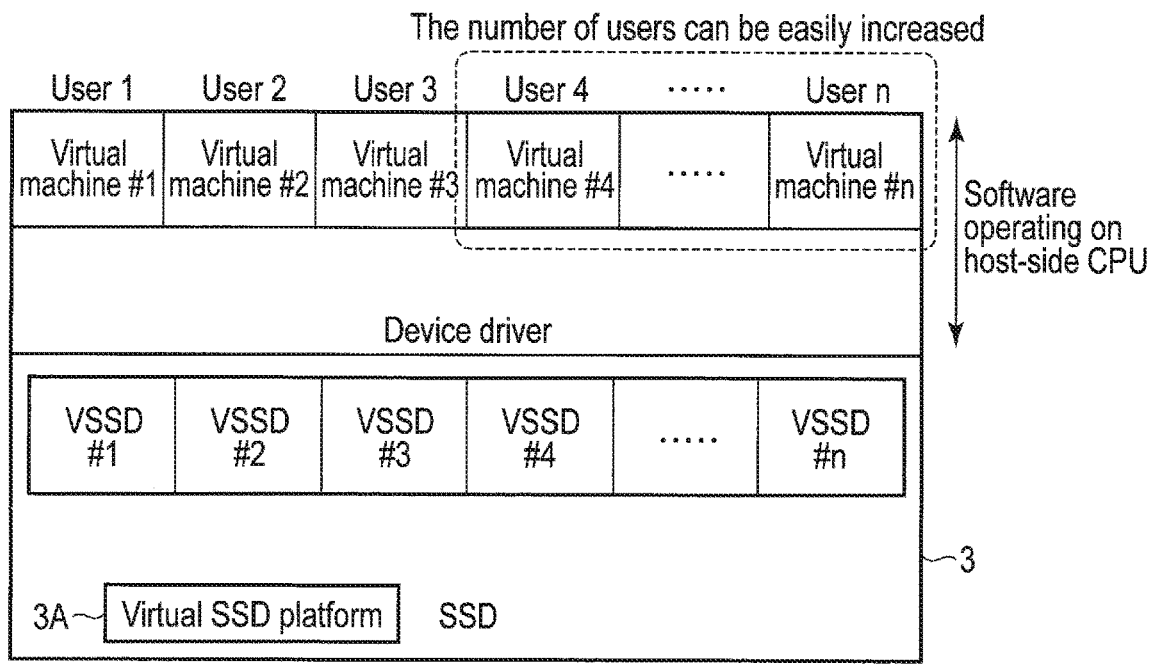
F I G. 4
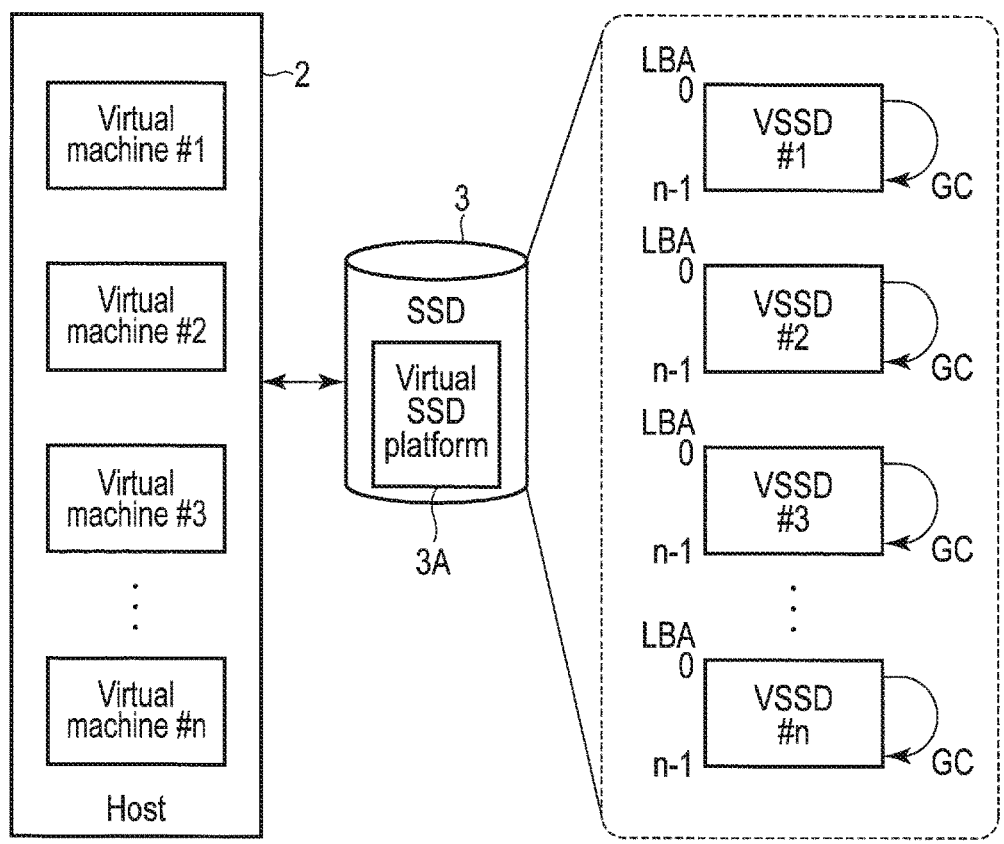
F I G. 5

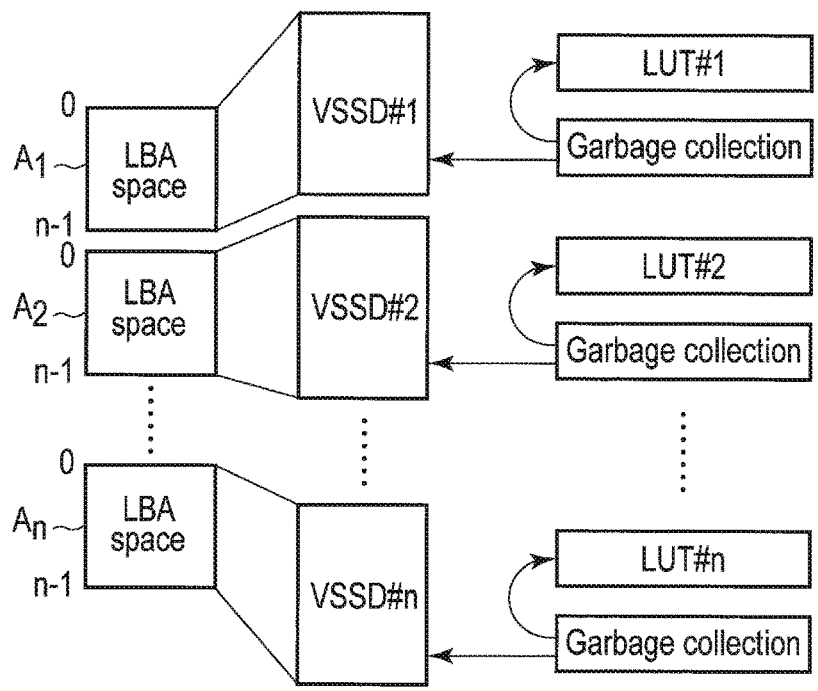
FIG. 6
VSSD management command
| Parameter | Explanation |
|---|---|
| Create/remove | 0h: Create<br>1h: Remove |
| Capacity | Capacity of user region (visible capacity) |
| Over-provisioning | Capacity of over-provisioning region |
FIG. 7
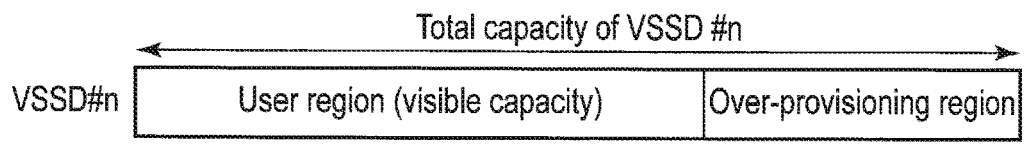
FIG. 8

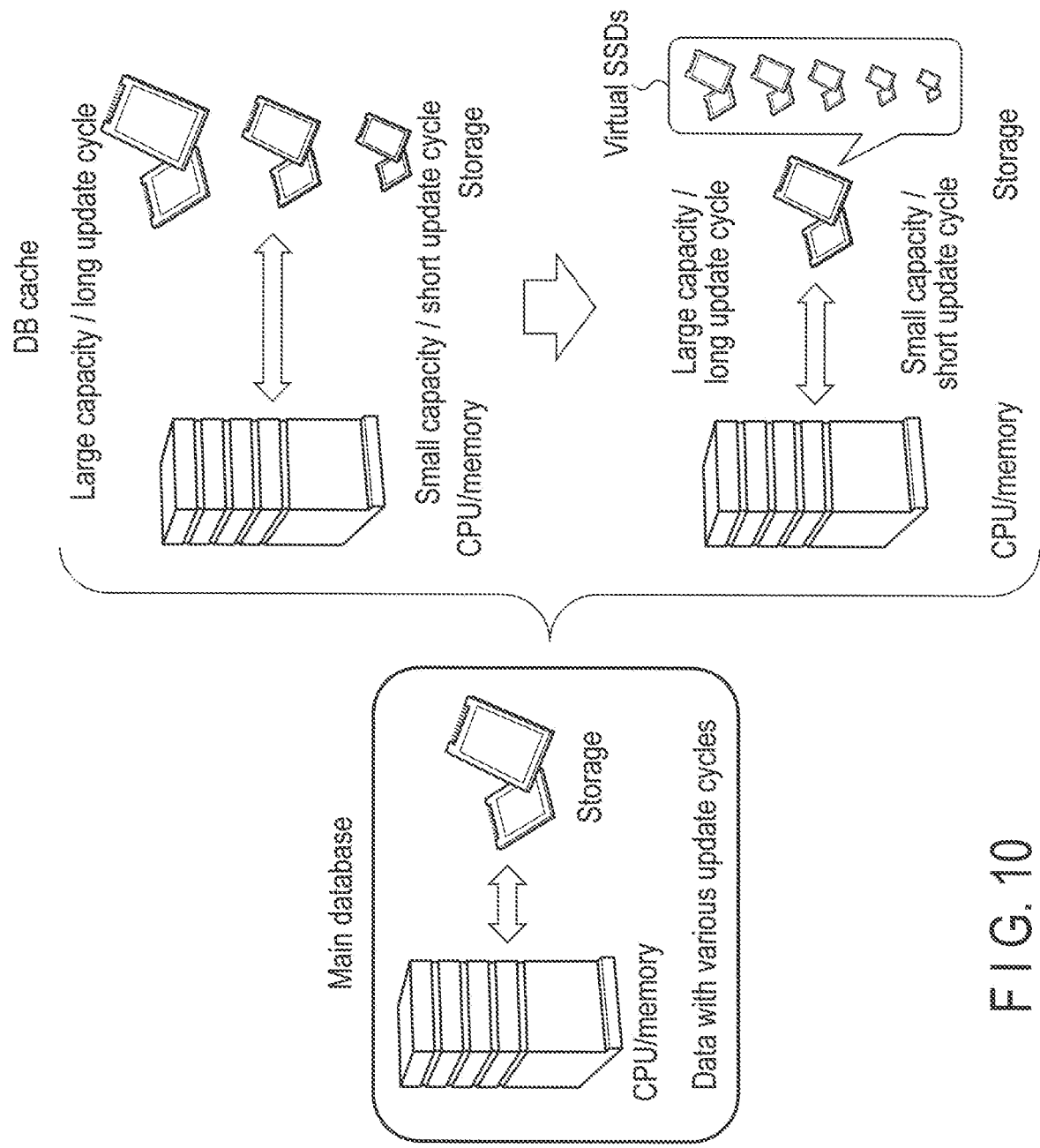
F I G. 10

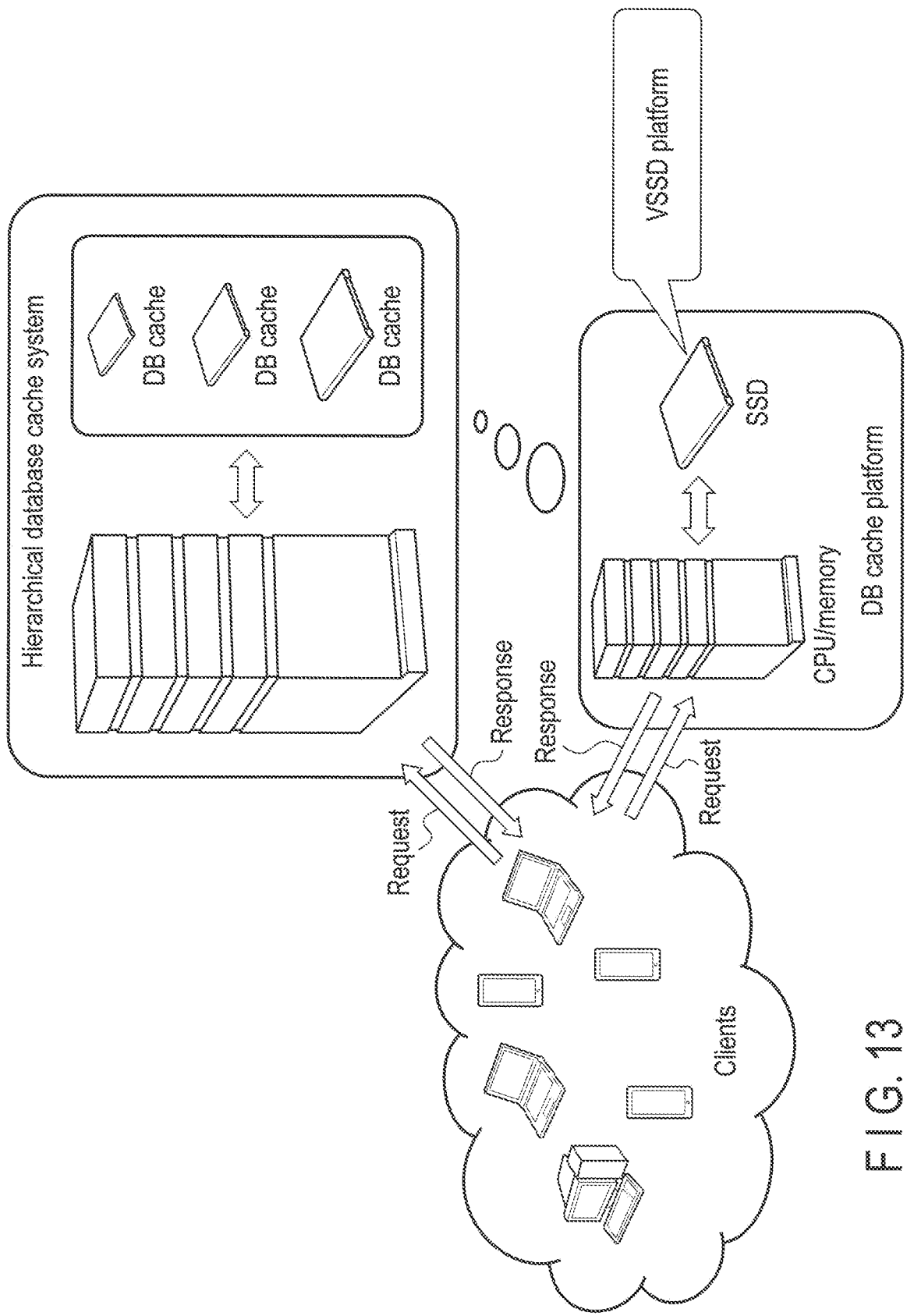
F I G. 13

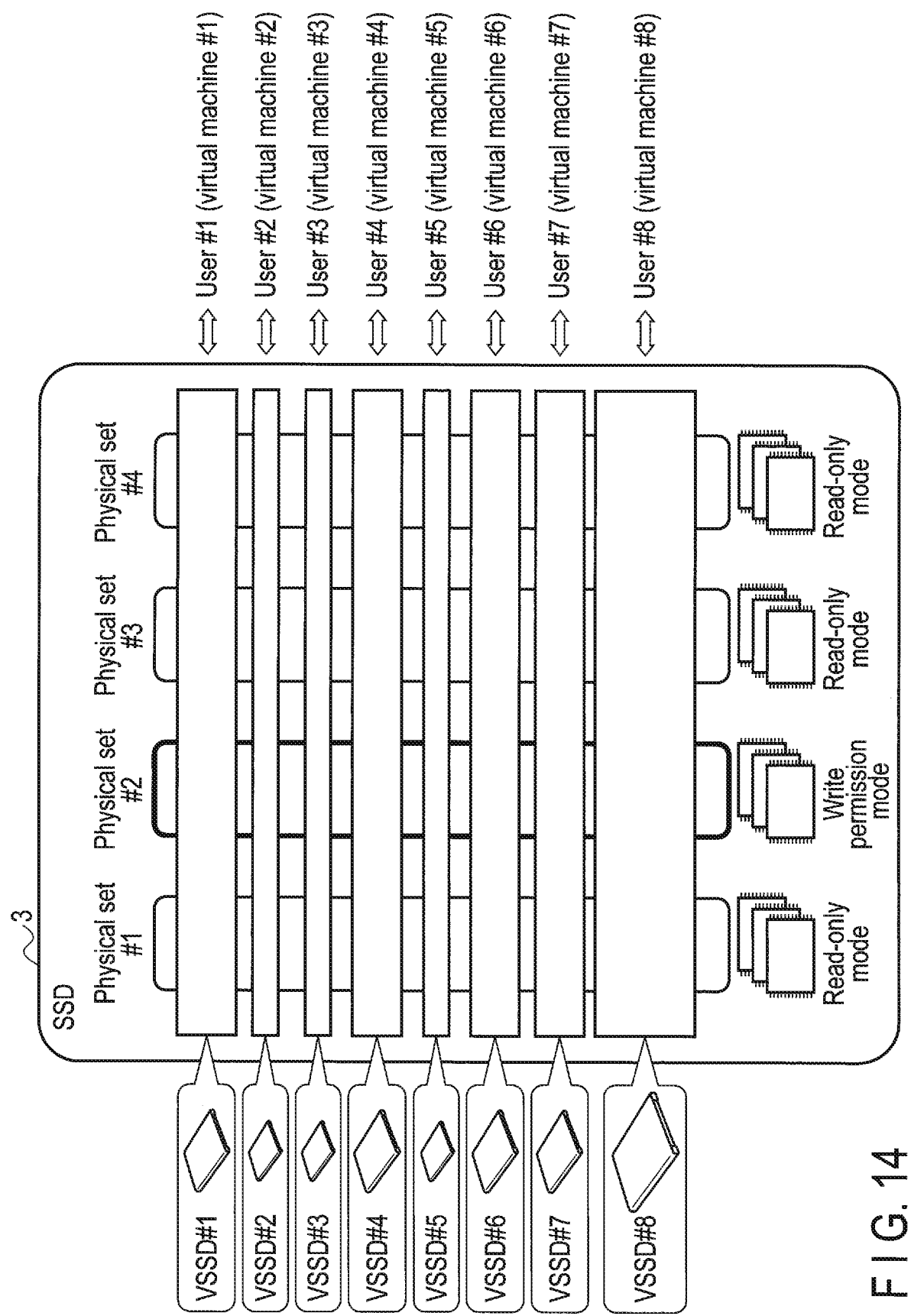
F I G. 14

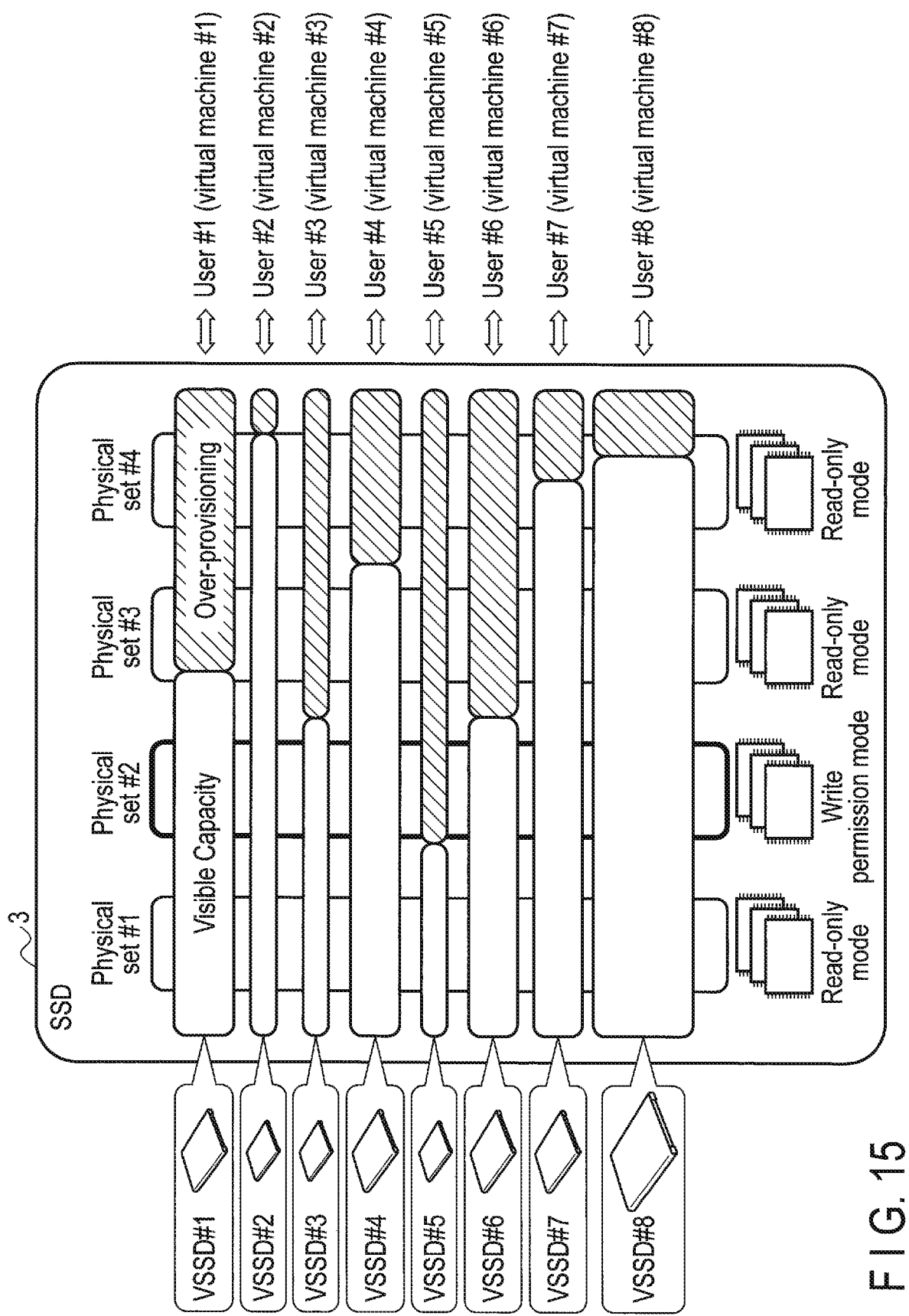
F I G. 15

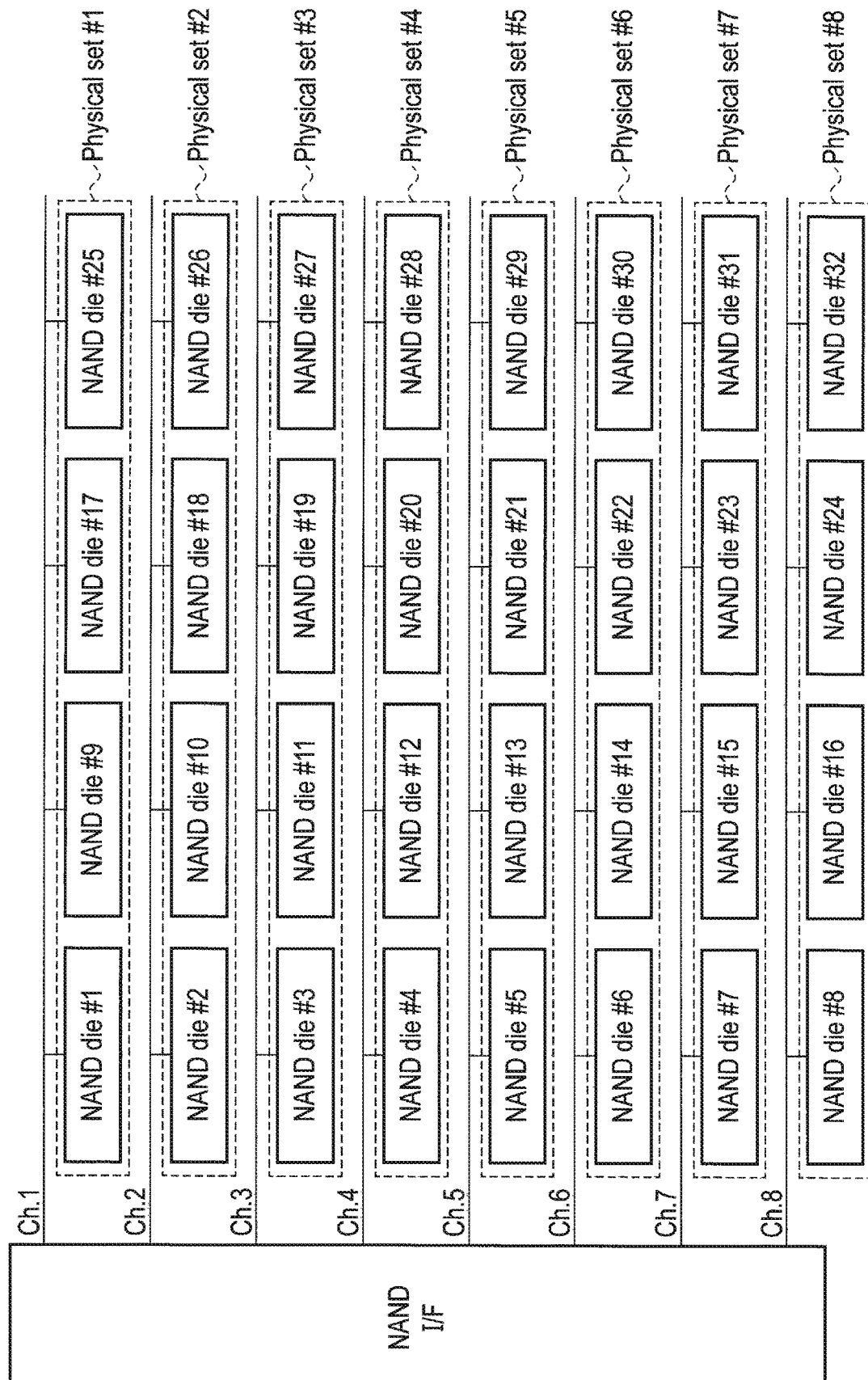
F I G. 17

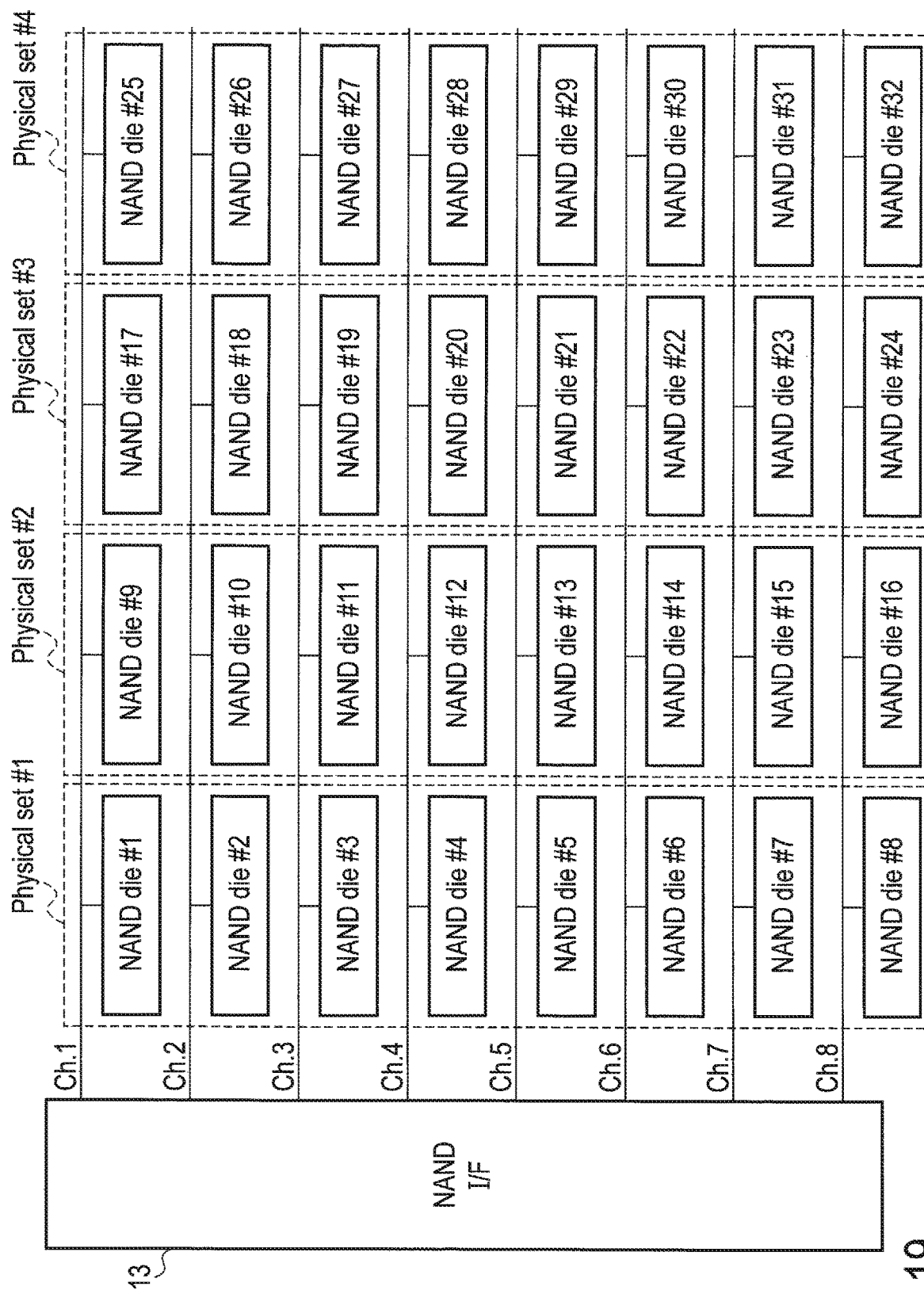
F I G. 19

FIG. 20

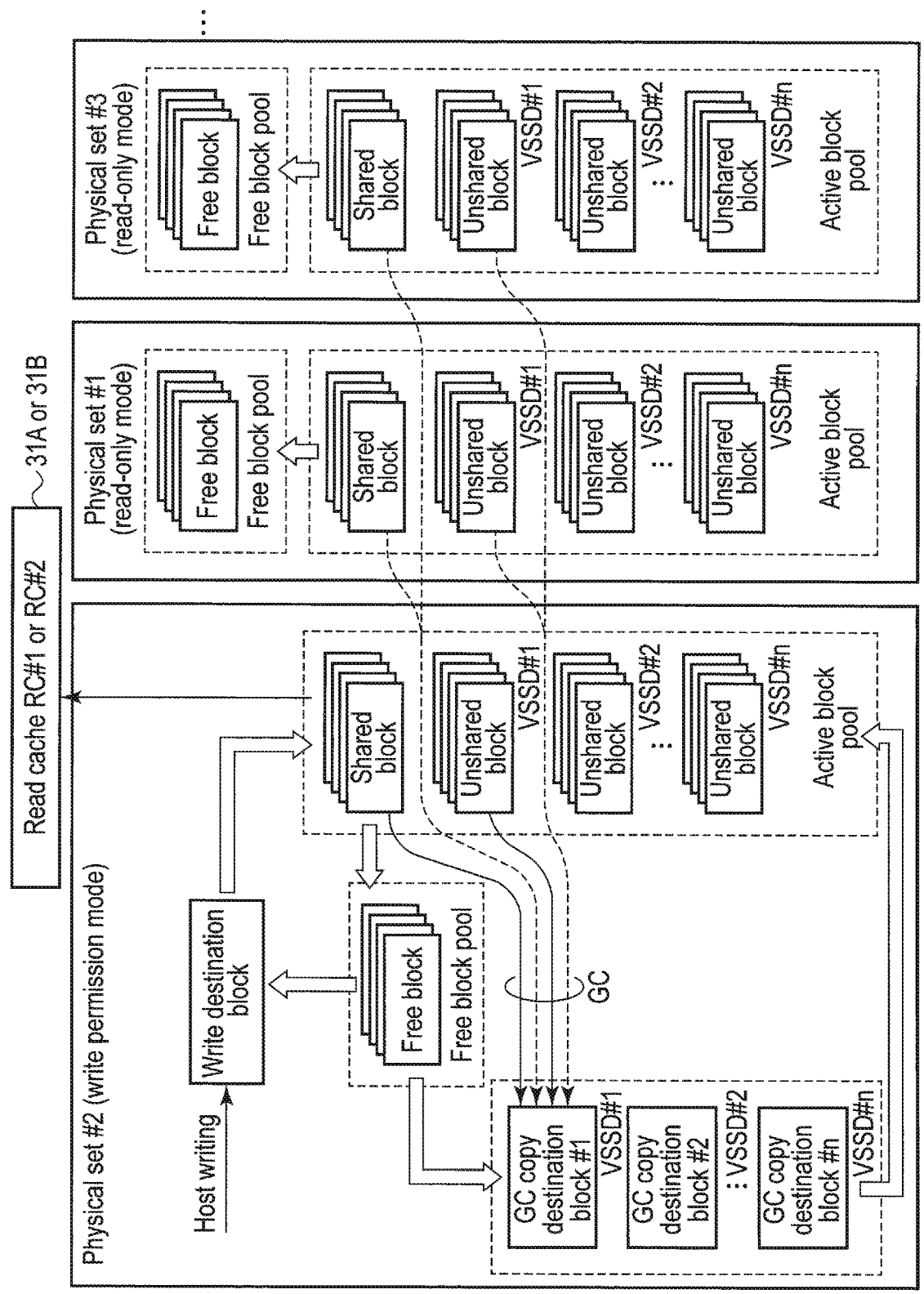
F I G. 21

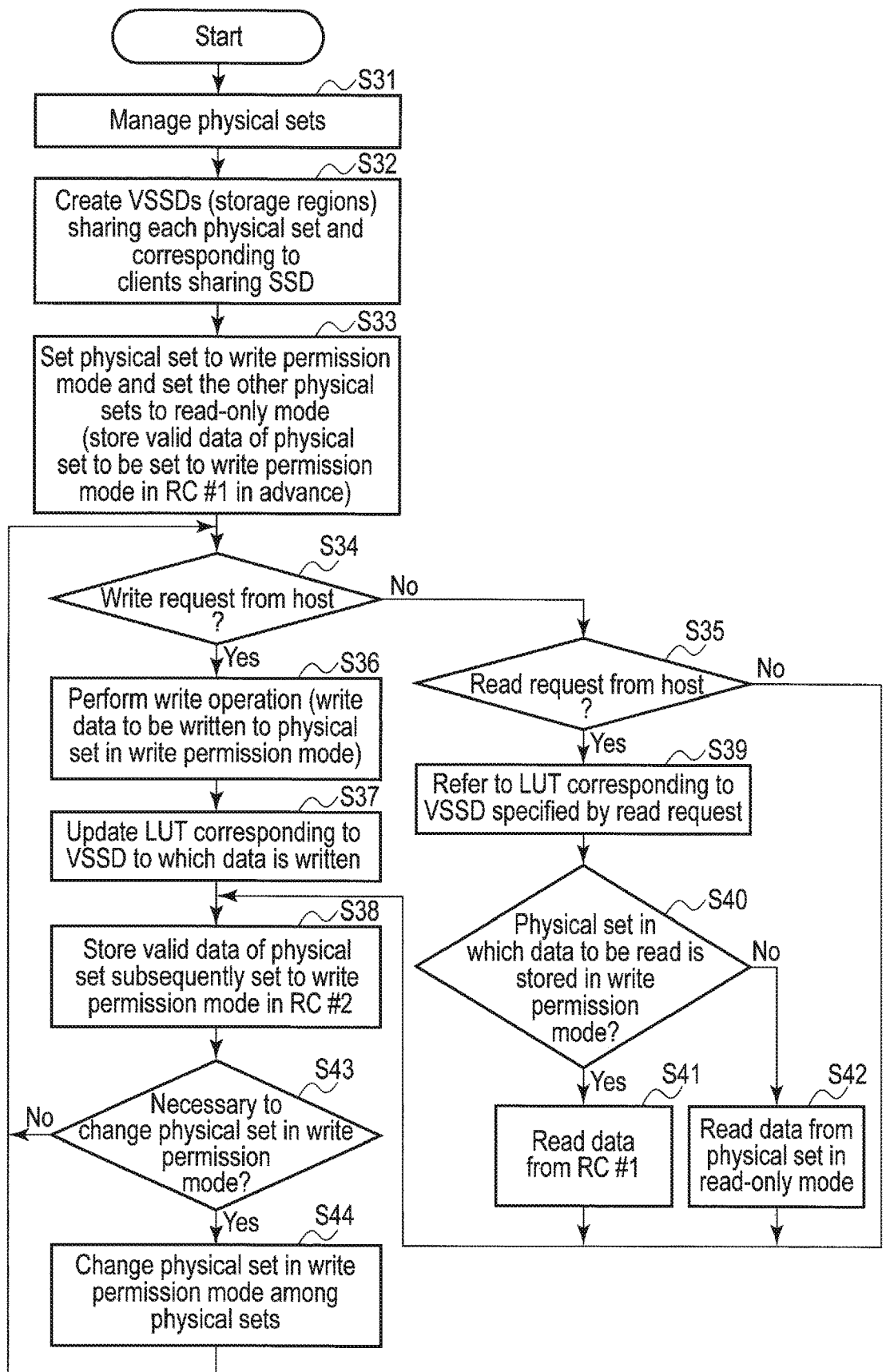
F I G. 24

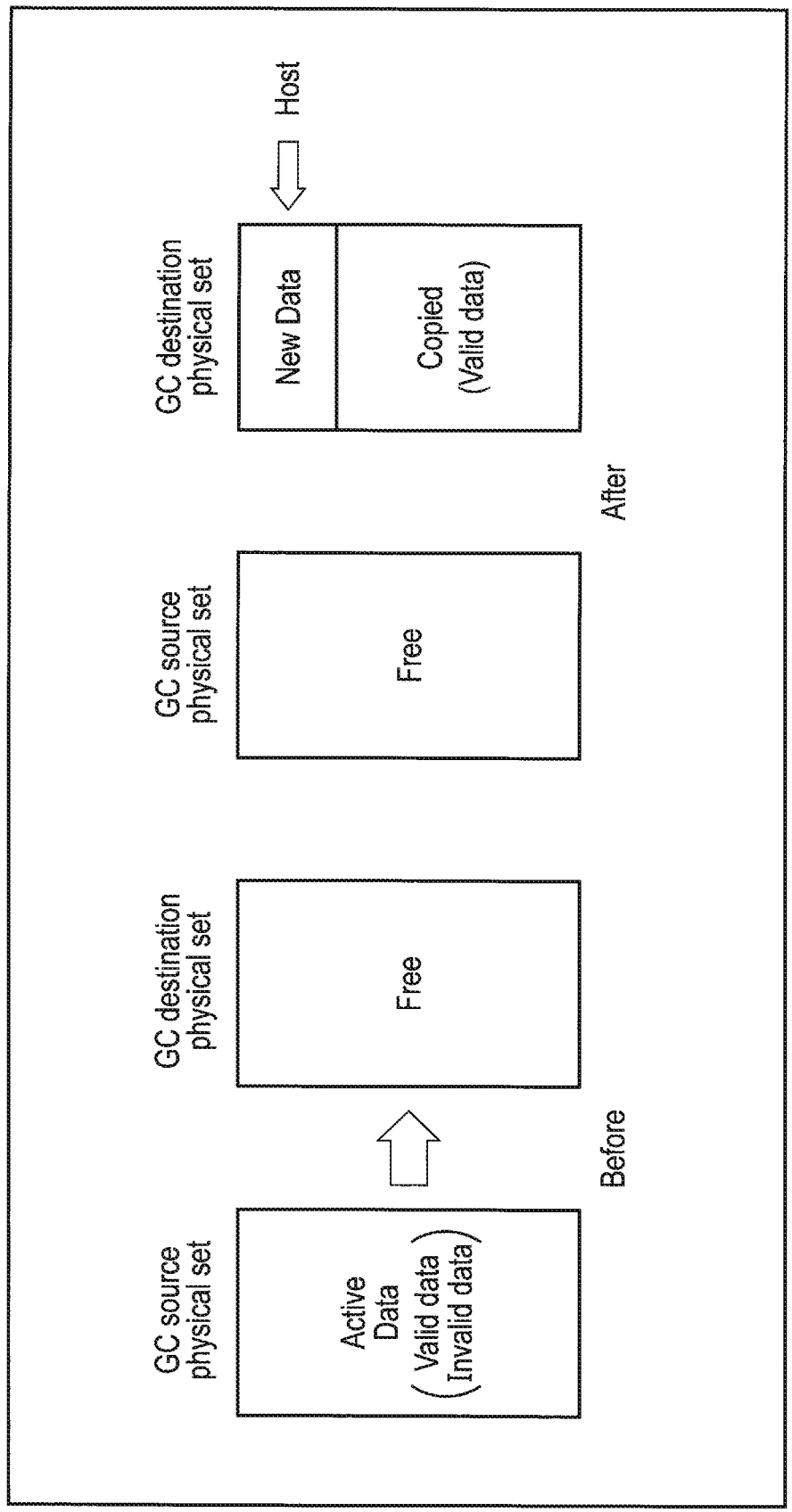
F I G. 29

MEMORY SYSTEM AND METHOD FOR CONTROLLING NONVOLATILE MEMORY

CROSS-REFERENCE TO RELATED APPLICATIONS

This application is a continuation of application Ser. No. 15/820,494 filed Nov. 22, 2017 and is based upon and claims the benefit of priority from Japanese Patent Application No. 2017-126594, filed Jun. 28, 2017, the entire contents of which are incorporated herein by reference.

FIELD

Embodiments described herein relate generally to a technology for controlling a nonvolatile memory.

BACKGROUND

In recent years, memory systems comprising nonvolatile memories have become widespread.

As one of the above memory systems, a solid-state drive (SSD) based on NAND flash technology is known.

Recently, in the server of a data center, an SSD has been used as storage. In the server of the data center, access requests (read requests, write requests, etc.,) may be concurrently issued from a plurality of end users to the SSD.

In this case, if a read request is issued for a nonvolatile memory die in which a write operation is in progress (access contention), the response time to the read request (read latency) is very long. In this way, the I/O performance may be degraded.

BRIEF DESCRIPTION OF THE DRAWINGS

FIG. 3 is a block diagram for explaining a virtualized environment using a conventional SSD and a virtualized environment using the memory system of the embodiment (an SSD including a virtual SSD platform).

FIG. 4 illustrates an example of the relationship between the number of storage regions (virtual SSDs [VSSDs]) in the memory system of the embodiment and the number of virtual machines on the host (server) side.

FIG. 5 is a block diagram for explaining each storage region (VSSD) in the memory system according to the embodiment.

FIG. 6 is illustrated to explain the management of storage regions (VSSDs) in the memory system according to the embodiment.

FIG. 7 is illustrated to explain a storage region (VSSD) management command applied to the memory system according to the embodiment.

FIG. 8 is illustrated to explain a user region and an over-provisioning region in each storage region (VSSD).

FIG. 10 is illustrated to explain a database cache environment realized by a plurality of VSSDs.

FIG. 13 is illustrated to explain an effect realized by applying a plurality of VSSDs to a database cache environment.

FIG. 14 is illustrated to explain the relationship between a plurality of physical sets and a plurality of VSSDs.

FIG. 15 illustrates the relationship between the user regions and over-provisioning regions included in the VSSDs of FIG. 14.

FIG. 17 illustrates a configuration example of a plurality of physical sets obtained by separating a plurality of NAND dies at channel borders.

FIG. 19 illustrates a configuration example of a plurality of physical sets each of which spans all the channels and is obtained by selecting a NAND die from every channel.

FIG. 20 illustrates a configuration example of some physical sets each of which spans only some of the channels.

FIG. 21 illustrates host writing and garbage collection (GC) in the memory system according to the embodiment.

FIG. 24 is a flowchart illustrating another example of the procedure of a read/write process performed by the memory system according to the embodiment.

FIG. 29 illustrates the content of a GC source physical set/GC destination physical set before copying data and the content of the GC source physical set/GC destination physical set after copying data.

DETAILED DESCRIPTION

Various embodiments will be described hereinafter with reference to the accompanying drawings.

In general, according to one embodiment, a memory system connectable to a host comprises a nonvolatile memory including a plurality of nonvolatile memory dies, and a controller electrically connected to the nonvolatile memory. The controller classifies the nonvolatile memory dies into a plurality of physical sets such that each of the nonvolatile memory dies belongs to only one physical set. The controller creates a plurality of storage regions which share each of the physical sets and each of which spans the physical sets. The controller sets one of the physical sets to a first mode for permitting a write operation and a read operation, and sets each of the other physical sets to a second mode for permitting a read operation and inhibiting a write operation. The controller writes data from the host to a write destination block allocated from a group of free blocks of the physical set currently set in the first mode in response to a write request including a parameter specifying one of the storage regions from the host. The controller reads data to be read from one of the storage regions in response to a read request including a parameter specifying one of the storage regions from the host. The controller changes the physical set in the first mode to the second mode and further changes one of the other physical sets in the second mode to the first mode such that all the physical sets are set to the first mode in turns.

Figure 1:
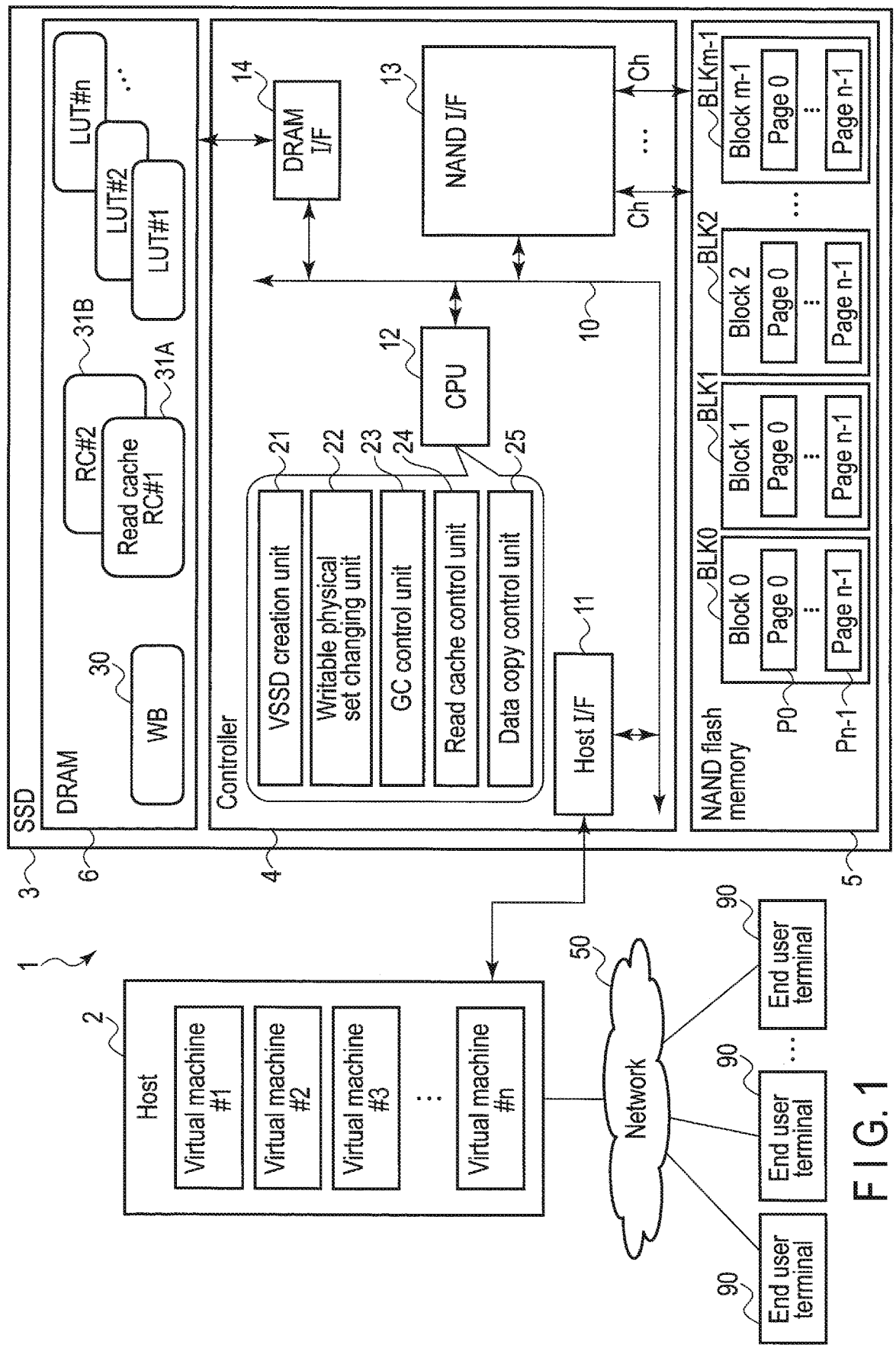
FIG. 1 is a block diagram illustrating a configuration example of a memory system according to an embodiment.

This specification explains the configuration of a data processing system 1 including a memory system according to an embodiment, referring to FIG. 1.

The memory system is a semiconductor storage device configured to write data to a nonvolatile memory and read data from the nonvolatile memory. The memory system is realized as, for example, a solid-state drive (SSD) 3 based on NAND flash technology.

The data processing system 1 includes a host (host device) 2 and the SSD 3. The host 2 is a data processing device such as a server or a personal computer. The typical examples of the server which functions as the host 2 include the server in a data center.

When the host 2 is realized by the server in a data center, the host (server) 2 may be connected to a plurality of end user terminals (clients) 90 via a network 50. The host 2 is capable of providing the end user terminals 90 with various services.

For example, the services which can be provided by the host (server) 2 include (1) a Platform as a Service (PaaS) which provides each client (end user terminal 90) with a system development platform and (2) an Infrastructure as a Service (IaaS) which provides each client (end user terminal 90) with an infrastructure such as a virtual server.

A plurality of virtual machines #1, #2, #3, . . . , # n may be executed on a physical server which functions as the host (server) 2. Virtual machines #1, #2, #3, . . . , # n are capable of functioning as virtual servers configured to provide their respective clients (end user terminals 90) with various services.

A container-based virtualization environment may be applied to the host (server) 2. In this case, a plurality of containers (user spaces) are provided on the operating system of the host (server) 2. Each container includes independent resources for executing an application and is capable of performing a function equivalent to that of a virtual machine (virtual server).

The SSD 3 may be used as the main storage of a data processing device (computing device) which functions as the host 2. The SSD 3 may be housed in the data processing device or may be connected to the data processing device via a cable or a network.

As the interface for mutually connecting the host 2 and the SSD 3, for example, SCSI, Serial Attached SCSI (SAS), ATA, Serial ATA (SATA), PCI Express (PCIe), Ethernet (registered trademark), Fibre channel or NVM Express (NVMe) (registered trademark) may be used.

The SSD 3 comprises a controller 4 and a nonvolatile memory (NAND flash memory) 5. The SSD 3 may comprise a random access memory such as a DRAM 6.

The NAND flash memory 5 includes a memory cell array including a plurality of memory cells arrayed in matrix. The NAND flash memory 5 may be either a NAND flash memory comprising a two-dimensional structure or a NAND flash memory comprising a three-dimensional structure.

The memory cell array of the NAND flash memory 5 includes a plurality of blocks (BLKs) 0 to m−1. Each of BLK 0 to BLK m−1 includes a large number of pages (here, P 0 to P n−1). BLK 0 to BLK m−1 function as erase units. Blocks may be called erase blocks, physical blocks or physical erase blocks. Each of P 0 to P n−1 includes a plurality of memory cells connected to the same word line. P 0 to P n−1 are the units of the operation for writing data and the operation for reading data.

The controller 4 is electrically connected to the NAND flash memory 5 which is a nonvolatile memory via a NAND interface 13 such as Toggle or Open NAND Flash Interface (ONFI). The controller 4 is a memory controller (control circuit) configured to control the NAND flash memory 5. The controller 4 may be realized by, for example, a one-chip LSI.

Figure 2:
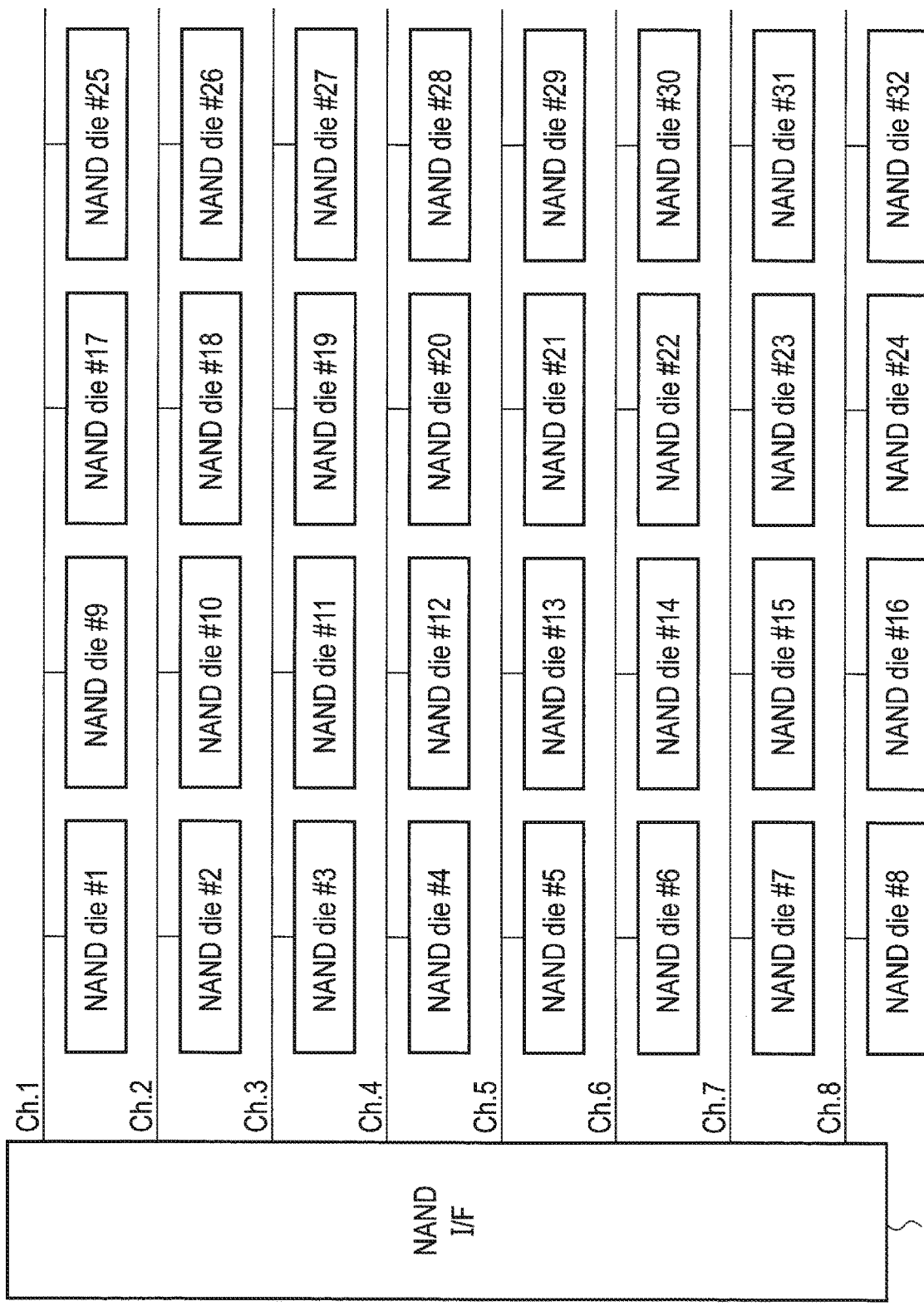
FIG. 2 is a block diagram illustrating the relationship between a NAND interface and a plurality of NAND flash memory dies in the memory system according to the embodiment.

As shown in FIG. 2, the NAND flash memory 5 includes a plurality of NAND flash memory dies (shown as NAND dies in FIG. 2). Each NAND flash memory die is a nonvolatile memory die including a memory cell array including a plurality of blocks and a peripheral circuit which controls the memory cell array. Each NAND flash memory die is independently operable. Thus, the NAND flash memory dies function as parallel operation units. The NAND flash memory dies may be also called NAND flash memory chips or nonvolatile memory chips.

FIG. 2 illustrates a case where eight channels Ch. 1, Ch. 2, . . . , Ch. 8 are connected to the NAND interface 13, and the same number of NAND flash memory dies are connected to each of channels Ch. 1, Ch. 2, . . . , Ch. 8 (for example, four dies per channel). Each channel includes a communication line (memory bus) for communicating with corresponding NAND flash memory dies.

The controller 4 controls NAND flash memory dies #1 to #32 via channels Ch. 1, Ch. 2, . . . , Ch. 8. The controller 4 is capable of concurrently driving channels Ch. 1, Ch. 2, . . . , Ch. 8.

In the present embodiment, the controller 4 classifies thirty two NAND flash memory dies #1 to #32 into a plurality of physical sets (NVM sets) such that each of the NAND flash memory dies belongs to only one physical set. These physical sets may be separated at the channel borders such that each physical set includes a dedicated channel. In this case, each physical set includes dedicated four dies on a corresponding dedicated channel. Alternatively, each physical set may span channels Ch. 1, Ch. 2, . . . , Ch. 8. In this case, each physical set may include some (for example, eight) dedicated dies connected to eight different channels.

Thus, in the present embodiment, nonvolatile memory dies #1 to #32 are classified into a plurality of physical sets such that each of NAND flash memory dies #1 to #32 belongs to only one physical set. In this way, a plurality of physical sets isolated from each other are managed.

As described above, each NAND flash memory die is independently operable. Thus, the NAND flash memory dies may function as the units of a parallel process.

However, normally, the operation for each NAND flash memory die is not performed in parallel. The operation for each NAND flash memory die is sequentially performed. If a read request is issued for a NAND flash memory die in which a write operation is in progress (read-on-write-die contention), the response time to the read request (read latency) may be very long.

The SSD 3 functions as storage shared by a plurality of end users (tenants). In the SSD 3, the read latency may be lengthened because of the access contention between end users (in other words, a conflict between a write access from an end user and a read access from another end user). More specifically, it is assumed that the write operation for a NAND flash memory die is performed in response to a write request from an end user. When a read request for reading data from the NAND flash memory die is issued from another end user during the above write operation, the read request cannot be executed until the running write operation is completed. In this way, the read latency may be lengthened.

As a method for stabilizing the read latency, a plurality of storage regions for a plurality of end users may be created, using dedicated channels or dedicated dies.

In this method, the storage regions are completely isolated from each other by allocating a dedicated channel or some dedicated dies to each of the storage regions. Thus, the end users use different channels or different dies. In this way, it is possible to prevent a conflict between a write access from an end user and a read access from another end user.

However, in this method, the maximum number of end users sharing an SSD, in other words, the maximum number of end users for which the I/O performance can be assured is limited to up to the number of channels or dies included in the SSD. In recent years, the capacity of each die has been increased because of the development of three-dimensional NAND flash memories, etc. To realize an SSD having a certain storage capacity, the increase in the capacity of each die leads to a decrease in the number of dies to be mounted on the SSD. Thus, in the above method, because of the increase in the capacity of each die, the maximum number of end users who can share a single SSD, in other words, the maximum number of end users for which the I/O performance can be assured may be decreased.

Further, in the above method for completely isolating the storage regions from each other, data writing may be concentrated on some specific channels or dies. In this case, the number of program/erase cycles of the specific blocks may easily reach a limit value in a short time. As a result, the life of the SSD may be shortened.

In the present embodiment, the SSD 3 creates a plurality of storage regions sharing each of a plurality of physical sets including different NAND flash memory dies. Each of the storage regions spans a plurality of physical sets. Each storage region may function as a virtual SSD (VSSD) which operates like an independent SSD. These storage regions (VSSDs) may be identified by the identifiers of different namespaces.

Some blocks obtained from each of a plurality of physical sets are allocated to each storage region (VSSD) as its physical resources. Each of a plurality of storage regions does not include a dedicated physical set. Instead, a plurality of storage regions share each of a plurality of physical sets. Thus, in the present embodiment, an infinite number of storage regions (VVSDs) can be created. In this configuration, more end users can be present on the single SSD 3 than the method for completely isolating storage regions from each other.

In the SSD 3 of the present embodiment, data writing is permitted for only at least one of a plurality of physical sets (for example, at least one or two physical sets). Data reading is permitted for all the other physical sets. For example, one of a plurality of physical sets is set to a first mode for permitting a write operation and a read operation (hereinafter, referred to as a write permission mode).

All the remaining physical sets are set to a second mode for permitting a read operation and inhibiting a write operation (hereinafter, referred to as a read-only mode). In the physical set in a write permission mode, data writing from the host 2 is permitted. In the physical set in a write permission mode, data writing (data copying) by garbage collection is also permitted.

When a write request including a parameter specifying one of a plurality of storage regions (VSSDs) is received from the host 2, write data is written to the write destination block allocated from the group of free blocks of the specific physical set currently set in a write permission mode. The write destination block indicates the block used for writing the write data from the host 2. The write destination block may be also called an input block.

In the present embodiment, the physical set to be set to a write permission mode is changed in order among a plurality of physical sets.

In a period, write data from the host 2 is always written to the write destination block in the specific physical set currently set in a write permission mode, and is not written to the physical sets currently set in a read-only mode. Thus, a possibility that read-on-write-die contention may occur can be limited to only the specific physical set currently set in a write permission mode. Since all the remaining physical sets are in a read-only mode, data writing is not performed in any of the remaining physical sets. In this way, read-on-write-die contention does not occur in any of the remaining physical sets.

As a result, in the SSD 3 of the present embodiment, the probability that read-on-write-die contention occurs can be reduced in comparison with that of normal SSDs in which data writing to all the physical sets is always permitted. In this manner, it is possible to prevent the degradation of the I/O performance caused by access contention (read-on-write-die contention) among a plurality of users sharing the SSD 3.

In the present embodiment, each physical set is shared by a plurality of VSSDs. Further, the physical set to be set to a write permission mode is changed in order among a plurality of physical sets. Thus, with regard to all the storage regions (VSSDs), data writing can be dispersed into a plurality of physical sets. In this way, the difference in the wear (in other words, the difference in the number of program/erase cycles) between physical sets can be reduced. This configuration can maximize the life of the SSD 3.

The SSD 3 of the present embodiment has a function for managing a plurality of VSSDs (hereinafter, referred to as a virtual SSD [VSSD] platform). The VSSD platform allows a plurality of virtual servers such as virtual machines #1, #2, #3, . . . , # n to use a plurality of VSSDs of the SSD 3 and further allows the virtual servers to directly access the VSSDs.

At least one of the VSSDs of the SSD 3 may be allocated to a virtual machine as the storage resources (virtual disk) dedicated to the virtual machine.

A virtual disk indicates a type of file which is recognized as a physical disk by a guest operating system executed on a virtual machine. Each virtual machine is capable of dealing with the virtual disk allocated to the virtual machine as a physical disk.

The SSD 3 is capable of creating and managing various storage regions (VSSDs) having different features regarding the capacity/performance (durability). The SSD 3 is also capable of removing the VSSD to be removed in response to a request from the host 2. The free area increased by the removal of a VSSD in the NAND flash memory 5 may be used to create a new VSSD.

Each VSSD has a function equivalent to that of a virtual disk. Thus, the SSD 3 can offload an emulation function for creating and managing a virtual disk from the host 2 into the SSD 3. In this way, the processing amount necessary for the storage management of the host 2 can be reduced. As a result, the I/O performance of the host 2 can be improved.

The controller 4 may also function as a flash translation layer (FTL) configured to manage the data of the NAND flash memory 5 and manage the blocks of the NAND flash memory 5.

The data management performed by the FTL includes, for example, (1) the management of mapping data indicating the correspondence relationships between logical addresses and the physical addresses of the NAND flash memory 5 and (2) a process for hiding the read/write in page units and the erase operation in physical block units. The logical addresses are the addresses used by the host 2 to specify the addresses of the SSD 3. As the logical addresses, normally, logical block addresses (LBAs) are used.

The management of mapping between logical block addresses (LBAs) and physical addresses is performed by using a lookup table (LUT) which functions as an address translation table (logical-to-physical address translation table).

In the present embodiment, the controller 4 manages mapping between LBAs and physical addresses for each VSSD, using a plurality of lookup tables (LUTs) #1, #2, . . . , # n corresponding to a plurality of VSSDs #1, #2, . . . , # n, respectively.

A physical address corresponding to an LBA indicates the physical storage location to which the data of the LBA is written in the NAND flash memory 5. Lookup tables (LUTs) #1, #2, . . . , # n may be loaded from the NAND flash memory 5 into the DRAM 6 when the SSD 3 is turned on. In general, each lookup table is relatively large. Thus, at least a part of each lookup table may be stored in the DRAM 6 as an address translation table cache.

In the NAND flash memory 5, data can be written to pages only once per erase cycle. Thus, the controller 4 writes update data corresponding to an LBA to a physical storage location different from the physical storage location in which previous data corresponding to the LBA is stored. The controller 4 updates a corresponding lookup table (LUT), associates the LBA with the physical storage location to which the update data is written, and invalidates the previous data.

The block management includes, for example, the management of bad blocks, wear leveling and garbage collection.

Wear leveling is the operation for leveling the wear of the blocks of the SSD 3.

In garbage collection (GC), to increase the number of free blocks to which data can be written, the valid data of some GC target blocks (which may be referred to as GC source blocks) including both valid data and invalid data is copied to other blocks (for example, free blocks). Here, valid data indicates data which is referred to by LUTs (in other words, data which is associated as the latest data from logical addresses) and which will be read from the host 2. Invalid data indicates data which is no longer read from the host 2. For example, data associated with a logical address is valid data. Data which is not associated with any logical address is invalid data. The controller 4 maps the LBAs of the copied valid data to the respective copy destination physical addresses. Each block including only invalid data as valid data has been copied to another block (copy destination block) is released as a free block. In this way, these blocks become available again after an erase operation is executed on each of the blocks.

In the present embodiment, the controller 4 collects valid data associated with the same VSSD to some blocks by garbage collection (GC). Subsequently, the controller 4 independently applies garbage collection (GC) to each VSSD. In this way, the data of different end users can be present in different blocks. Thus, even while garbage collection is applied to a VSSD, the possibility that this garbage collection has a detrimental effect on a normal access to the other VSSDs can be dramatically reduced. As a result, the problem of noisy neighbors can be solved.

The configuration of the controller 4 is explained below.

The controller 4 includes a host interface 11, a CPU 12, the NAND interface 13, a DRAM interface 14, etc. The CPU 12, the NAND interface 13 and the DRAM interface 14 are mutually connected via a bus 10.

The host interface 11 is a host interface circuit configured to perform communication with the host 2. The host interface 11 may be, for example, a PCIe controller (NVMe controller). The host interface 11 receives various requests (commands) from the host 2. These requests (commands) include, for example, a write request (write command), a read request (read command) and a request for managing VSSDs (VSSD management command).

Each write command requests the SSD 3 to write the data specified by the write command. Each write command may include a starting LBA, a transfer length and a VSSD specifying parameter for specifying the VSSD to which data should be written. The above VSSDs may be realized by a plurality of namespaces. When the VSSDs are realized by a plurality of namespaces, the identifies (NSIDs) of the namespaces may be used as VSSD specifying parameters. The NSID of each write command is an identifier for uniquely identifying the namespace (here, the VSSD) to which data should be written.

Each read command requests the SSD 3 to read the data specified by the read command. Each read command may include a starting LBA, a transfer length and a VSSD specifying parameter for specifying the VSSD from which data should be read. When the above VSSDs are realized by a plurality of namespaces, the identifiers (NSIDs) of the namespaces may be used as VSSD specifying parameters. The NSID of each read command is an identifier for uniquely identifying the namespace (here, the VSSD) from which data should be read.

Each VSSD management command is a command for requesting the SSD 3 to create or remove a VSSD. Each VSSD management command may include various parameters to create a VSSD conforming to the storage requirements of each end user. The data center provider can freely set the capacity and performance of the storage (VSSD) provided to each end user in accordance with the needs of the end user.

The CPU 12 is a processor configured to control the host interface 11, the NAND interface 13 and the DRAM interface 14. The CPU 12 performs various processes by loading a control program (firmware) into the DRAM 6 from the NAND flash memory 5 or a ROM (not shown) when the SSD 3 is turned on, and executing the firmware. The firmware may be loaded into an SRAM (not shown) provided in the controller 4. The CPU 12 is capable of performing, for example, a command process for processing various commands from the host 2 in addition to the above FTL process. The operation of the CPU 12 is controlled by the firmware executed by the CPU 12. A part of or the entire part of the FTL process and the command process may be performed by dedicated hardware in the controller 4.

The CPU 12 is capable of functioning as a VSSD creation unit 21, a writable physical set changing unit 22, a garbage collection (GC) control unit 23, a read cache control unit 24 and a data copy control unit 25.

The VSSD creation unit 21 has a multi-VSSD management function for managing a plurality of VSSDs.

Each VSSD is equivalent to a type of logical region (storage region) provided in the NAND flash memory 5 which is a nonvolatile memory. Each VSSD is created to span all the physical sets. Each VSSD includes at least one block allocated to the VSSD from each of all the physical sets.

The VSSD creation unit 21 classifies NAND flash memory dies #1 to #32 such that each of NAND flash memory dies #1 to #32 belongs to only one physical set, and creates a plurality of storage regions (VSSDs) which share each of a plurality of physical sets and each of which spans a plurality of physical sets based on the creation request of each VSSD from the host 2.

The host 2 is capable of requesting the SSD 3 to create each VSSD, using the above VSSD management command. The VSSD creation unit 21 is capable of creating each VSSD satisfying the requirements for the capacity/performance (durability), etc., specified by the host 2.

The host 2 is capable of specifying a parameter related to the capacity/performance (durability), etc., for each VSSD by issuing some VSSD management commands to the SSD 3.

A parameter related to the performance (durability) of a VSSD may be, for example, a parameter specifying the capacity of the over-provisioning region of the VSSD. The over-provisioning region is explained below.

Over-provisioning indicates the allocation of a storage capacity which is not visible as an available user space (which may be referred to as a user accessible LBA space or a visible region) to the host 2 in the SSD 3. Each VSSD may include a user region and an over-provisioning region. The capacity of the user region is a storage capacity which is visible as a user accessible LBA space to the host 2. The space to which a storage capacity which is not visible as a user accessible LBA space to the host 2 is allocated is the over-provisioning region. By over-provisioning, a group of blocks corresponding to a capacity exceeding a user accessible LBA space (in other words, exceeding the capacity of the user region) can be used to write data to the VSSD.

In a normal SSD, the host is capable of specifying the number of LBAs for a namespace as the capacity of the user region. However, the host is not capable of specifying the capacity of the over-provisioning region to be allocated to the namespace. Normally, only one over-provisioning region is set in a single SSD.

In the present embodiment, in addition to the capacity of the user region (in other words, the number of LBAs allocated to each VSSD), the capacity of the over-provisioning region can be set for each VSSD in response to a request from the host 2.

For example, regarding a VSSD having a large amount of data writing (in other words, a VSSD to which update data is frequently written), the host 2 may specify the capacity of the over-provisioning region such that the ratio of the capacity of the over-provisioning region to the capacity of the user region (the capacity of the over-provisioning region/ the capacity of the user region) is relatively high.

In a VSSD in which the ratio of the capacity of the over-provisioning region to the capacity of the user region is high, the write amplification of the VSSD can be effectively decreased by using the over-provisioning region having the large size. Even if all the blocks corresponding to the capacity of the user region of the VSSD are filled with data, and as a result, these blocks do not contain any available page unless an erase operation is executed on each of the blocks, instead of these blocks, blocks corresponding to the over-provisioning region can be used to write (update) data. Thus, the time that garbage collection is applied to the VSSD can be adequately delayed. As update data is written to the group of blocks of the over-provisioning region, the data of the group of blocks of the user region is invalidated by the update. A block in which all the data has been invalidated can be used again without its garbage collection. Since the write amplification of the VSSD can be effectively decreased, the number of writes/erases of the group of blocks of the VSSD can be decreased. Thus, the durability of the VSSD can be improved.

The writable physical set changing unit 22 sets at least one of a plurality of physical sets to a write permission mode for permitting a write operation and a read operation, and sets the other physical sets to a read-only mode for permitting a read operation and inhibiting a write operation. In the physical set currently set in a write permission mode, data writing (copying) by garbage collection is permitted in addition to data writing from the host 2.

Further, the writable physical set changing unit 22 changes the physical set currently set in a write permission mode to a read-only mode and changes one of the other physical set currently set in a read-only mode to a write permission mode such that all the physical sets are set to a write permission mode in turns. Thus, the physical set to be set to a write permission mode is selected from a plurality of physical sets in rotation.

For example, when four physical sets #1 to #4 shared by a plurality of VSSDs are present, in a period T1, physical set #1 may be set to a write permission mode, and all the other physical sets #2 to #4 may be set to a read-only mode. The write data from the host 2 is written to physical set #1, specifically, to the write destination block allocated from the group of free blocks of physical set #1. The write data from the host 2 is not written to the blocks of physical sets #2 to #4. When data reading is requested from the host 2, the data to be read is read from the arbitrary physical set (physical set #1, #2, #3 or #4) in which the data is stored.

In the subsequent period T2, the physical set to be set to a write permission mode is changed from physical set #1 to one of the other physical sets.

The process for changing the physical set to be set to a write permission mode is performed when a condition (rotation condition) is satisfied. As the rotation condition, for example, one of the following conditions (1) to (4) may be employed.

(1) The number of free blocks of the physical set currently set in a write permission mode is decreased to threshold X.

(2) The number of free blocks allocated as write destination blocks from the group of free blocks of the physical set currently set in a write permission mode reaches threshold Y.

(3) The sum of the number of free blocks allocated as write destination blocks from the group of free blocks of the physical set currently set in a write permission mode and the number of free blocks allocated as copy destination blocks (which may be referred to as GC copy destination blocks or GC destination blocks) from the group of free blocks of the physical set currently set in a write permission mode reaches threshold Z.

(4) The elapsed time from the time that a physical set is set to a write permission mode reaches threshold T.

In period T2, physical set #2 may be set to a write permission mode, and physical sets #1, #3 and #4 may be set to a read-only mode.

In the subsequent period T3, physical set #3 may be set to a write permission mode, and physical sets #1, #2 and #4 may be set to a read-only mode.

In the subsequent period T4, physical set #4 may be set to a write permission mode, and physical sets #1 to #3 may be set to a read-only mode.

The number of physical sets to be set to a write permission mode in a period is not limited to one. In a period, at least one physical set should be set to a write permission mode, and all the other physical sets should be set to a read-only mode.

The read cache control unit 24 is capable of performing a process for storing the valid data stored in the physical set to be subsequently set to a write permission mode (specifically, one of the physical sets currently set in a read-only mode) in a read cache. In other words, the read cache control unit 24 is capable of storing the valid data of a physical set in a read cache (for example, read cache 31A [RC #1]) before the physical set is set to a write permission mode. All the valid data of the physical set may be stored in RC #1. Alternatively, only part of the valid data of the physical set may be stored in read cache 31A (RC #1).

When a read request for reading the data present in a physical set is issued from the host 2 while the physical set operates as the physical set currently set in a write permission mode, the controller 4 is capable of reading the data specified by the read request from read cache 31A (RC #1). Thus, when the SSD 3 is configured to use read cache 31A (RC #1), read-on-write-die contention does not occur in either the physical sets currently set in a read-only mode or the physical set currently set in a write permission mode. In this way, it is possible to further effectively reduce the interference between a plurality of end users to which a plurality of VSSDs are allocated, respectively.

While the physical set operates as the physical set currently set in a write permission mode, the read cache control unit 24 is capable of performing a process for storing, in read cache 31B (RC #2), the valid data stored in another physical set to be subsequently set to a write permission mode. In other words, read caches 31A and 31B (RC #1 and RC #2) function as a double buffer. One of read caches 31A and 31B (RC #1 and RC #2) is used for data reading to the host 2. The other one of read caches 31A and 31B (RC #1 and RC #2) is used as the copy destination of the valid data copied from the physical set to be subsequently set to a write permission mode.

In this embodiment, each of read caches 31A and 31B (RC #1 and RC #2) is implemented in a random access memory such as the DRAM 6. In another embodiment, each of read caches 31A and 31B (RC #1 and RC #2) may be realized by the SRAM provided in the controller 4.

The data copy control unit 25 is capable of performing a process for copying all the valid data stored in the physical set to be subsequently set to a write permission mode to the physical set currently set in a write permission mode to prevent read-on-write-die contention from occurring in the physical set currently set in a write permission mode without using any read cache. In this manner, the physical set to be subsequently set to a write permission mode can be changed to a free physical set which does not contain valid data.

When a read request for reading the data present in the physical set to be subsequently set to a write permission mode is issued from the host 2 while valid data is copied from the physical set to be subsequently set to a write permission mode to the physical set currently set in a write permission mode, the controller 4 is capable of reading the data from the physical set to be subsequently set to a write permission mode. Here, the period in which the valid data is copied indicates a state in which the operation for copying all the valid data of the physical set to be subsequently set to a write permission mode has not been completed yet, and thus, the copy operation is in progress.

After the operation for copying all the valid data is completed, the controller 4 sets the physical set changed to a free physical set to a write permission mode, and further sets (changes) the physical set in a write permission mode so far to a read-only mode. The physical set newly set to a write permission mode is a free physical set which does not contain valid data. Thus, normally, a read request for the physical set currently set in a write permission mode is not generated. In this manner, in the physical set currently set in a write permission mode, read-on-write-die contention does not occur.

In some cases, new data from the host 2 is written to the physical set newly set to a write permission mode, and the host 2 requests the operation for reading the data. In this case, the controller 4 is capable of reading the data from a write buffer (WB) 30 and returning the read data to the host 2 by maintaining the write data in the write buffer (WB) 30.

The NAND interface 13 is a memory control circuit configured to control the NAND flash memory 5 under the control of the CPU 12. The DRAM interface 14 is a DRAM control circuit configured to control the DRAM 6 under the control of the CPU 12. A part of the storage region of the DRAM 6 is used to store the write buffer (WB) 30. Another part of the storage region of the DRAM 6 is used to store read caches 31A and 31B (RC #1 and RC #2). Further, another part of the storage region of the DRAM 6 is used to store a plurality of lookup tables (LUTs) #1 to # n.

FIG. 3 illustrates a virtualized environment using a conventional SSD and a virtualized environment using the SSD 3 of the present embodiment (the SSD including a virtual SSD [VSSD] platform 3A).

The left part of FIG. 3 illustrates the virtualized environment using the conventional SSD. In the virtualized environment using the conventional SSD, the software operating on the host (server) side CPU includes virtual disk service software. The virtual disk service software generates virtual disks #1, #2 and #3 from physical storage (here, the SSD) by emulation. The virtual disk service software manages the resources of physical storage (here, the SSD) as a logical storage pool, generates virtual disks #1, #2, #3, . . . , by using the storage pool, and provides virtual machines #1, #2, #3, . . . , with virtual disks #1, #2, #3, . . . , respectively.

The right part of FIG. 3 illustrates the virtualized environment using the SSD 3 including the VSSD platform 3A.

In the virtualized environment using the SSD 3 including the VSSD platform 3A, VSSD #1, VSSD #2, VSSD #3, . . . , are created in the SSD 3 by the VSSD platform 3A provided in the SSD 3.

VSSD #1, VSSD #2, VSSD #3, . . . , have a function equivalent to that of virtual disks #1, #2, #3, . . . . Thus, the emulation function for creating virtual disks #1, #2, #3, . . . , may be removed from the software operating on the host (server) side CPU. As a result, the configuration of the software operating on the host (server) side CPU can be simplified. In this manner, the delay of the process in the software can be shortened, and thus, the I/O performance of the host (server) can be improved. The physical resources of the SSD 3 are shared by virtual machines #1, #2, #3, . . . . Virtual machines #1, #2, #3, . . . , are capable of directly accessing VSSD #1, VSSD #2, VSSD #3, . . . , provided in the SSD 3, respectively, via a device driver.

FIG. 4 illustrates the relationship between the number of VSSDs in the SSD 3 and the number of virtual machines on the host (server) side.

FIG. 4 assumes that virtual machines #1 to # n are executed on the host (server) side, and VSSDs #1 to # n corresponding to virtual machines #1 to # n, respectively, are created in the SSD 3. In the virtualized environment using the SSD 3 including the VSSD platform 3A, the configuration of the software operating on the host (server) side CPU can be simplified. Thus, the number of virtual machines on the host (server) side can be easily increased. In this way, the number of end users per host (server) can be easily increased. As described above, in the present embodiment, a plurality of VSSDs do not include their respective dedicated physical sets. Instead, a plurality of VSSDs share each of a plurality of physical sets. Thus, in the present embodiment, an infinite number of VSSDs can be created. This configuration allows a further increase in the number of end users per host (server).

Now, this specification explains each VSSD created in the SSD 3, referring to FIG. 5.

The VSSD platform 3A of the SSD 3 creates a plurality of VSSDs #1 to # n corresponding to virtual machines #1 to # n, respectively. In this case, the VSSD platform 3A is capable of managing a plurality of logical address spaces (LBA spaces) corresponding to VSSDs #1 to # n, respectively.

As described above, each VSSD may be realized by a namespace. In this case, a plurality of namespaces are used to logically divide the storage region of the NAND flash memory 5 into a plurality of regions. Each namespace is a storage region in the NAND flash memory 5. A logical address range (LBA range) is allocated to each namespace. Each namespace is identified by the identifier of the namespace. When each VSSD is realized by a namespace, an LBA range (LBA 0 to LBA n−1) is allocated to each VSSD. The size of the LBA range (in other words, the number of LBAs) may differ depending on the VSSD (namespace). Each LBA range starts from LBA 0.

FIG. 6 illustrates the VSSD management performed by the SSD 3.

It is assumed that a plurality of VSSDs are realized by a plurality of namespaces. Logical address space (LBA space) A1 with logical addresses from 0 to n−1 is allocated to VSSD #1. Logical address space (LBA space) A2 with logical addresses from 0 to n−1 is allocated to VSSD #2. Similarly, logical address space (LBA space) An with logical addresses from 0 to n−1 is allocated to VSSD # n.

In the present embodiment, a lookup table (LUT) is divided into a plurality of LUTs corresponding to VSSDs, respectively. LUTs #1 to # n corresponding to VSSDs #1 to # n are managed by the controller 4 of the SSD 3.

LUT #1 manages the mapping between LBA space A1 of VSSD #1 and the physical addresses of the NAND flash memory 5. LUT #2 manages the mapping between LBA space A2 of VSSD #2 and the physical addresses of the NAND flash memory 5. LUT # n manages the mapping between LBA space An of VSSD # n and the physical addresses of the NAND flash memory 5.

The controller 4 is capable of performing garbage collection independently for each VSSD (storage region) by using LUTs #1 to # n. In the garbage collection of a VSSD, as the target for garbage collection, at least one block is selected from the blocks allocated to the VSSD. The valid data of the selected block is copied to a block (free block) allocated to the VSSD. An LUT corresponding to the VSSD is updated. The copy destination physical address is associated with an LBA corresponding to the copied data. This garbage collection independent for each VSSD (storage region) prevents the data associated with different VSSDs from being stored in the same block by garbage collection.

FIG. 7 illustrates a VSSD management command.

A VSSD management command is a command used for VSSD management including the creation and removal of a VSSD. A VSSD management command may include the following parameters:

(1) create/remove;
(2) capacity; and
(3) over-provisioning.

The value of 0 h of the create/remove parameter requests the SSD 3 to create a VSSD. The value of 1 h of the create/remove parameter requests the SSD 3 to remove a VSSD. When the removal of a VSSD is requested, a parameter specifying the identifier (VSSDID) of the VSSD to be removed may be set in the VSSD management command.

The capacity parameter specifies the capacity (visible capacity) of the user region to be allocated to the VSSD to be created. The capacity of the user region is equivalent to a user accessible LBA space as described above. The capacity of the user region is equivalent to the number of LBAs to be allocated to the VSSD. The capacity of the user region may be specified by either bytes or the number of LBAs to be allocated to the VSSD.

The over-provisioning parameter specifies the capacity of the over-provisioning region to be allocated to the VSSD to be created.

Now, with reference to FIG. 8, this specification explains the operation for allocating a user region and an over-provisioning region to each VSSD based on a request specifying a combination of the capacity of the user region and the capacity of the over-provisioning region for the VSSD from the host 2.

Based on a request specifying a combination of the capacity of the user region and the capacity of the over-provisioning region for each VSSD from the host 2, the VSSD creation unit 21 of the controller 4 allocates the sum of the specified capacity of the user region and the specified capacity of the over-provisioning region to the VSSD.

When the host 2 requests the SSD 3 to create a VSSD (here, VSSD # n), the host 2 specifies the capacity of the user region to be allocated to VSSD # n and the capacity of the over-provisioning region to be allocated to VSSD # n. The VSSD creation unit 21 of the controller 4 allocates the sum of the specified capacity of the user region and the specified capacity of the over-provisioning region to VSSD # n. As shown in FIG. 8, the sum of the allocated capacity of the user region and the allocated capacity of the over-provisioning region is the total capacity of VSSD # n. As described above, the performance and durability of VSSD # n is improved with increasing ratio of the capacity of the over-provisioning region to the capacity of the user region. The host 2 is capable of requesting the SSD 3 to create a VSSD in which the performance and durability conform to the requirements of an end user by using a capacity parameter and an over-provisioning parameter. The SSD 3 creates a VSSD in which the performance and durability conform to the requirements of an end user by allocating the sum of the capacity of the user region specified by a capacity parameter and the capacity of the over-provisioning region specified by an over-provisioning parameter to the VSSD.

Figure 9:
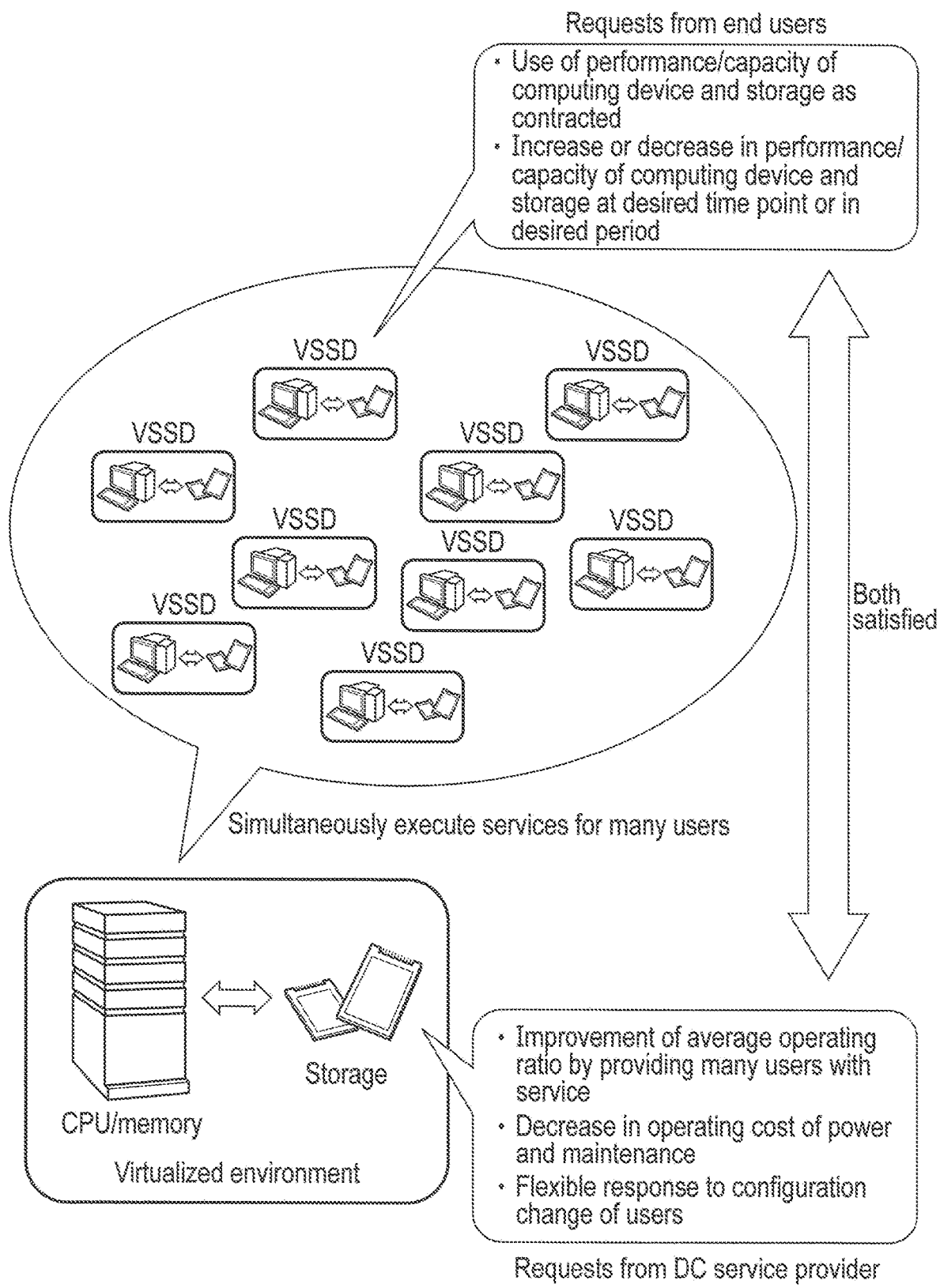
FIG. 9 is illustrated to explain an IssS/PaaS environment realized by a plurality of VSSDs.

FIG. 9 illustrates an IssS/PaaS environment realized by a plurality of VSSDs.

In the IssS/PaaS environment, individual end users may wish to use the performance/capacity of the computing device or storage as contracted, or may wish to increase or decrease the performance/capacity of the computing device or storage at a desired time point or in a desired period. The data center service provider may wish to improve the average operating ratio of the server by executing a large number of services for a large number of end users, in other words, by increasing the number of end users per server, or may wish to decrease the operating cost of power and maintenance, or may wish to flexibly deal with the configuration change of the end users.

In the present embodiment, a plurality of VSSDs sharing a plurality of physical sets are created. Thus, the number of VSSDs which can be created can be easily increased. In this way, it is possible to simultaneously execute a large number of services for a large number of end users and increase the number of end users per server.

FIG. 10 illustrates a database cache environment realized by a plurality of VSSDs.

In a cloud system using a database cache environment such as SNS service, a plurality of SSDs corresponding to a plurality of types of contents having different update cycles, respectively, may be necessary to decrease the write amplification and the amount of data writing.

In the present embodiment, it is possible to decrease the write amplification and the amount of data writing to the single SSD 3 without preparing a plurality of SSDs (physical SSDs) by creating a plurality of VSSDs corresponding to a plurality of types of contents having different update cycles, respectively, on the SSD 3.

Figure 11:
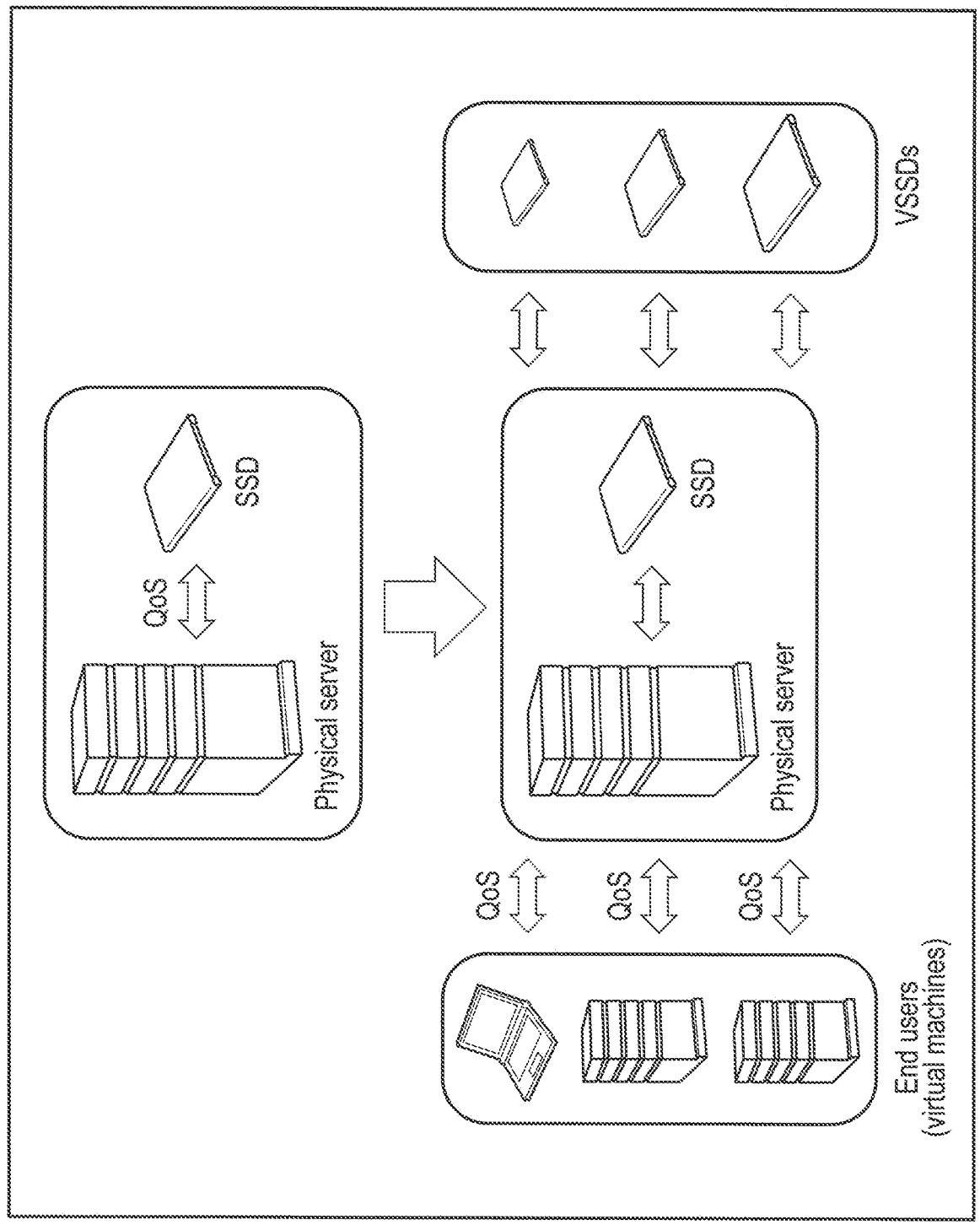
FIG. 11 is illustrated to explain the transition of QoS requirements.

FIG. 11 illustrates the transition of QoS requirements.

In the conventional technique, QoS is defined between a physical server and storage as shown in the upper part of FIG. 11. In the present embodiment, as shown in the lower part of FIG. 11, a plurality of VSSDs corresponding to a plurality of end users are created on the SSD 3. Thus, QoS can be defined between the end users and the VSSDs.

Figure 12:
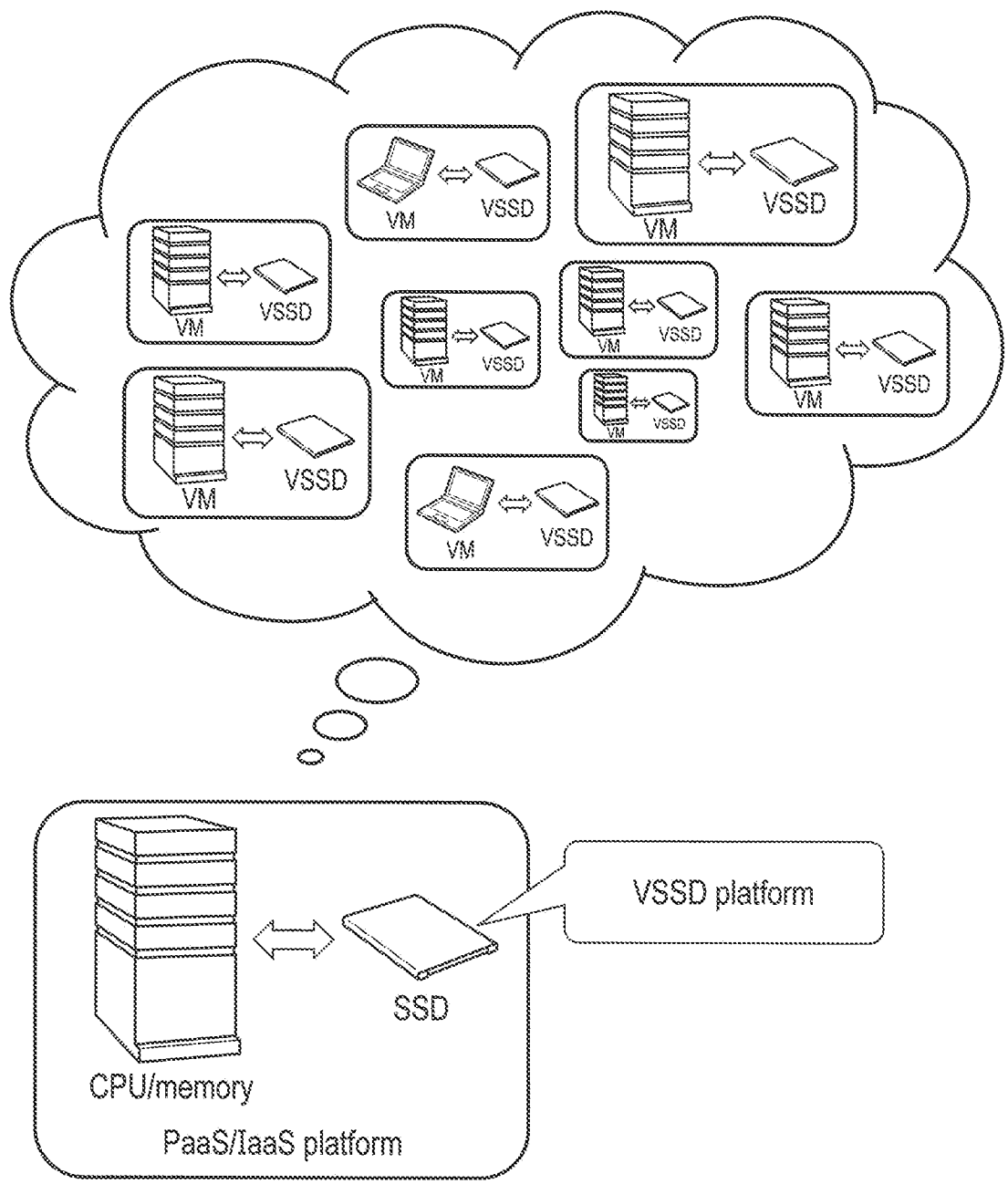
FIG. 12 is illustrated to explain an effect realized by applying a plurality of VSSDs to an IssS/Paas environment.

FIG. 12 illustrates an effect realized by applying a plurality of VSSDs to an IssS/PaaS environment.

In the present embodiment, for example, a large number of virtualized environments each including a virtual machine (VM) and a VSSD can be operated on a physical server by the VSSD platform provided in the SSD 3. The virtualized environments are capable of simultaneously executing a large number of services for a large number of end users. In this way, the operating ratio of the server can be increased.

In the present embodiment, as described above, the probability that read-on-write-die contention occurs can be reduced. Thus, it is possible to prevent the degradation of the I/O performance caused by access contention (read-on-write-die contention) among a plurality of end users sharing the SSD 3.

FIG. 13 illustrates an effect realized by applying a plurality of VSSDs to a database cache environment.

The upper part of FIG. 13 illustrates a hierarchical database cache system including a plurality of database caches. In the hierarchical database cache system, a plurality of physical SSDs storing a plurality of types of contents having different update cycles, respectively, are used as database caches.

In the present embodiment, as shown in the lower part of FIG. 13, it is possible to effectively provide a plurality of types of contents having different update cycles in the single SSD 3 by creating a plurality of VSSDs in the SSD 3.

FIG. 14 illustrates the relationship between a plurality of physical sets and a plurality of VSSDs.

FIG. 14 illustrates a case where NAND flash memory dies #1 to #32 included in the NAND flash memory 5 are classified into physical sets #1, #2, #3 and #4, and VSSDs #1, #2, #3, #4, #5, #6, #7 and #8 sharing physical sets #1, #2, #3 and #4 are created. In FIG. 14, physical sets #1, #2, #3 and #4 are shown by vertical bars. VSSDs #1, #2, #3, #4, #5, #6, #7 and #8 are shown by horizontal bars perpendicular to physical sets #1, #2, #3 and #4.

The area of bars corresponding to VSSDs #1, #2, #3, #4, #5, #6, #7 and #8 indicate the capacity (total capacity) of VSSDs #1, #2, #3, #4, #5, #6, #7 and #8.

VSSDs #1 to #8 are used as the storage regions for end users #1 to #8 (virtual machines #1 to #8), respectively.

In a period, only at least one of physical sets #1, #2, #3 and #4 is set to a write permission mode, and all the other physical sets are set to a read-only mode. FIG. 14 illustrates a case where physical set #2 is set to a write permission mode, and physicals sets #1, #3 and #4 are set to a read-only mode.

FIG. 15 illustrates the relationship between the user regions and over-provisioning regions included in the VSSDs of FIG. 14.

As described above, the SSD 3 of the present embodiment is capable of setting the capacity (visible capacity) of the user region and the capacity of the over-provisioning region to be allocated to each VSSD in response to a request from the host 2. In each VSSD, the over-provisioning region is shown by hatching.

Figure 16:
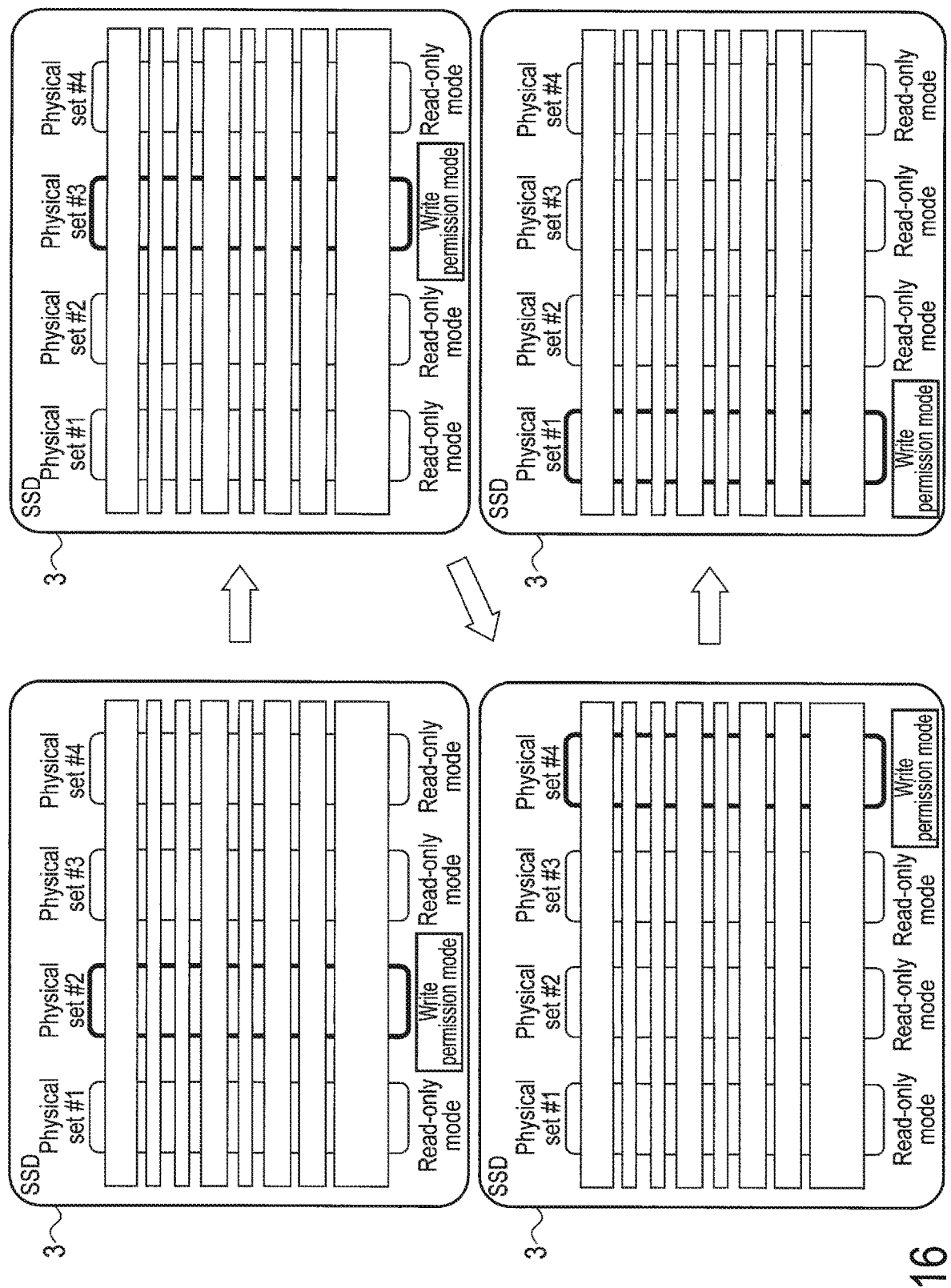
FIG. 16 illustrates an operation for changing the physical set to be set to a write permission mode among a plurality of physical sets such that the physical sets are set to a write permission mode in turns.

FIG. 16 illustrates an operation for changing the physical set currently set in a write permission mode to a read-only mode and further changing each of the other physical sets currently set in a read-only mode to a write permission mode such that all the physical sets are set to a write permission mode in turns.

As shown in the top left part of FIG. 16, in a period (cycle), physical set #2 is set to a write permission mode, and physical sets #1, #3 and #4 are set to a read-only mode.

As shown in the top right part of FIG. 16, in the subsequent period (cycle), the physical set to be set to a write permission mode is changed from physical set #2 to physical set #3, and physical sets #1, #2 and #4 are set to a read-only mode. In this way, physical set #2 is changed from a write permission mode to a read-only mode. Physical set #3 is changed from read-only mode to a write permission mode.

As shown in the bottom left part of FIG. 16, in the subsequent period (cycle), the physical set to be set to a write permission mode is changed from physical set #3 to physical set #4, and physical sets #1, #2 and #3 are set to a read-only mode.

As shown in the bottom right part of FIG. 16, in the subsequent period (cycle), the physical set to be set to a write permission mode is changed from physical set #4 to physical set #1, and physical sets #2, #3 and #4 are set to a read-only mode.

In the subsequent period (cycle), as shown in the top left part of FIG. 16, physical set #2 is set to a write permission mode again, and physical sets #1, #3 and #4 are set to a read-only mode again.

FIG. 17 illustrates a configuration example of a plurality of physical sets obtained by separating NAND flash memory dies #1 to #32 at channel borders.

In FIG. 17, physical set #1 includes NAND flash memory dies #1, #9, #17 and #25 included in channel Ch. 1. Physical set #2 includes NAND flash memory dies #2, #10, #18 and #26 included in channel Ch. 2. Similarly, physical set #8 includes NAND flash memory dies #8, #16, #24 and #32 included in channel Ch. 8.

Figure 18:
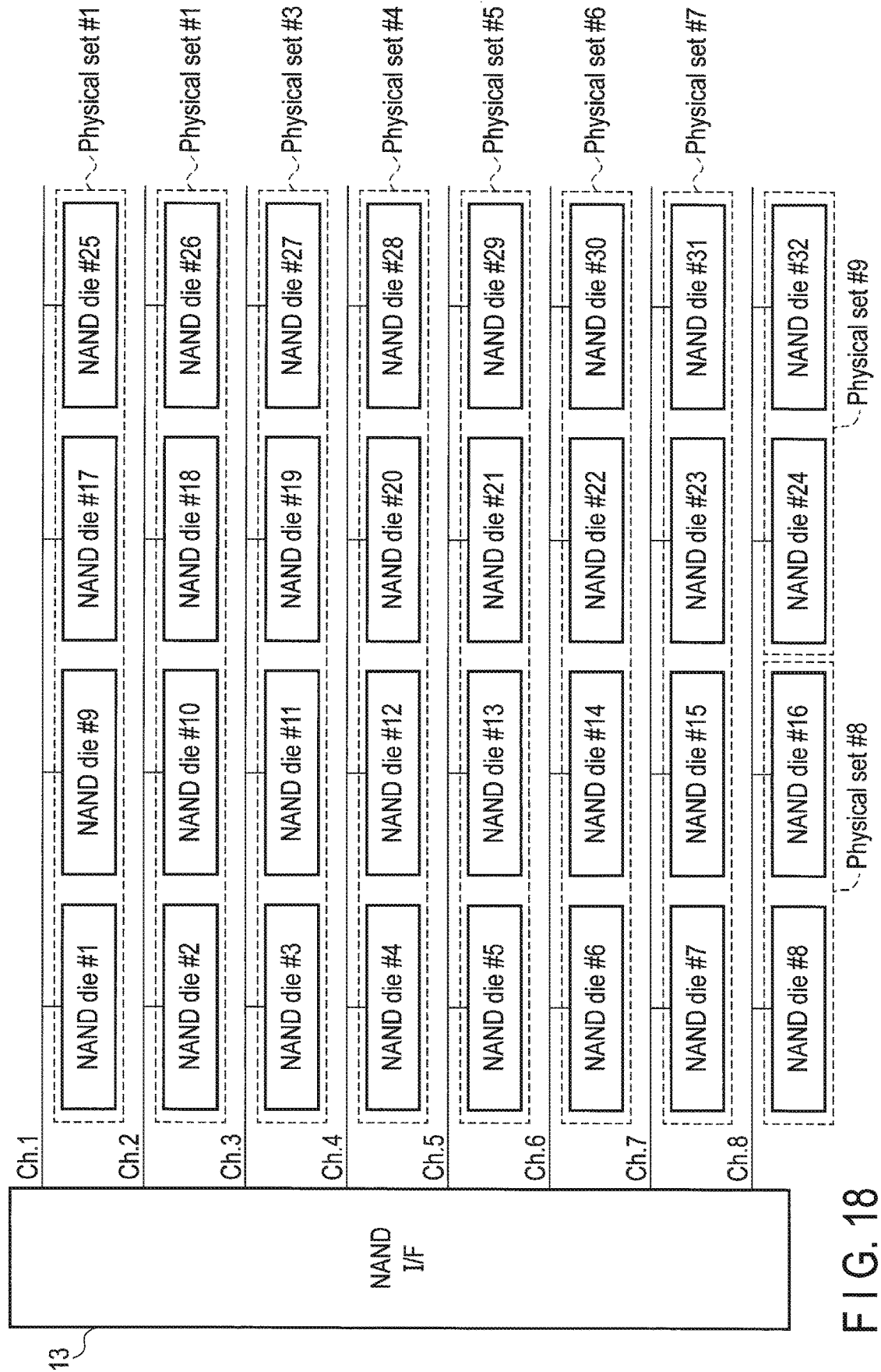
FIG. 18 illustrates a configuration example of some physical sets sharing the same channel.

FIG. 18 illustrates a configuration example of some physical sets sharing the same channel.

In FIG. 18, physical sets #1 to #7 comprise their respective dedicated channels. However, physical sets #8 and #9 share channel Ch. 8. Physical set #8 includes NAND flash memory dies #8 and #16 included in channel Ch. 8. Physical set #9 includes NAND flash memory dies #24 and #32 included in channel Ch. 8.

FIG. 19 illustrates a configuration example of a plurality of physical sets each of which spans all the channels and is obtained by selecting a NAND die from every channel.

In FIG. 19, physical set #1 includes NAND flash memory dies #1 to #8 which belong to channels Ch. 1 to Ch. 8, respectively. Physical set #2 includes NAND flash memory dies #9 to #16 which belong to channels Ch. 1 to Ch. 8, respectively. Similarly, physical set #4 includes NAND flash memory dies #25 to #32 which belong to channels Ch. 1 to Ch. 8, respectively.

Figure 20:
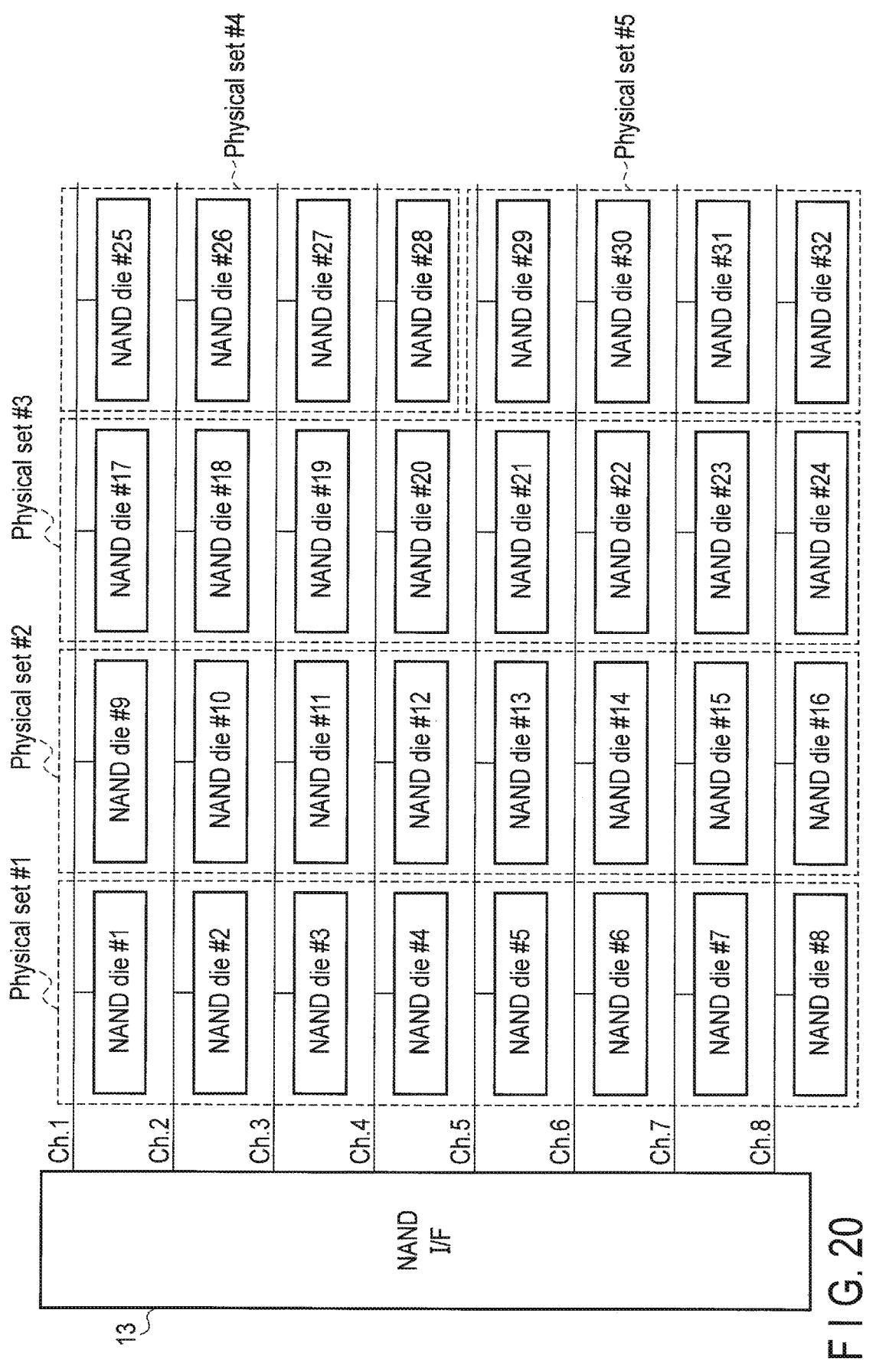

FIG. 20 illustrates a configuration example of some physical sets each of which spans only some of the channels.

In FIG. 20, physical sets #1 to #3 span all of the channels Ch. 1 to Ch. 8. However, physical sets #4 and #5 span only some of the channels. Physical set #4 spans only channels Ch. 1 to Ch. 4 and includes NAND flash memory dies #25 to #28 which belong to channels Ch. 1 to Ch. 4, respectively. Physical set #5 spans only channels Ch. 5 to Ch. 8 and includes NAND flash memory dies #29 to #32 which belong to channels Ch. 5 to Ch. 8, respectively.

FIG. 21 illustrates host writing and garbage collection (GC) in the SSD 3.

FIG. 21 illustrates a case where physical set #2 is set to a write permission mode, and physical sets #1, #3, ..., are set to a read-only mode.

In each of physical sets #1, #2, #3, ..., the state of each block included in each die which belongs to the physical set is roughly classified into an active block in which valid data is stored or a free block in which valid data is not stored.

Each block which belongs to a physical set and is an active block is managed by an active block pool corresponding to the physical set. For example, each active block of physical set #1 is managed by an active block pool corresponding to physical set #1. Each active block of physical set #2 is managed by an active block pool corresponding to physical set #2. Each active block of physical set #3 is managed by an active block pool corresponding to physical set #3.

Each block which belongs to a physical set and is a free block is managed by a free block pool corresponding to the physical set. For example, each free block of physical set #1 is managed by a free block pool corresponding to physical set #1. Each free block of physical set #2 is managed by a free block pool corresponding to physical set #2. Each free block of physical set #3 is managed by a free block pool corresponding to physical set #3.

Host writing is performed in the following procedure.

The controller 4 selects a free block from the group of free blocks of physical set #2 currently set in a write permission mode (in other words, from a free block pool corresponding to physical set #2), and allocates the selected free block as a write destination block. The controller 4 writes the data to be written (write data) to the write destination block in response to a write request from the host 2. In this case, the write data may be written to the same write destination block regardless of the VSSD specified by the received write request. When this write destination block is entirely filled with the write data from the host 2, the write destination block transitions to an active block and is managed by the active block pool of physical set #2. The controller 4 selects a free block from the group of free blocks of physical set #2 (in other words, from a free block pool corresponding to physical set #2), and allocates the selected free block as a new write destination block. In this case, the free block having the least number of program/erase cycles may be selected from the free block pool.

The state of each active block is roughly classified into a shared block or an unshared block. A shared block indicates a block which contains the data of some VSSDs. An unshared block indicates a block in which only the data of a specific VSSD is stored.

Immediately after the write destination block transitions to an active block, normally, this active block contains a plurality of types of data corresponding to a plurality of VSSDs. Thus, in the active block pool of physical set #2, the active block is managed as a shared block.

In a physical set, when all the data of an active block (a shared block or an unshared block) is invalidated by garbage collection or data updating, the active block transitions to a free block and is managed by a free block corresponding to the physical set.

In the configuration of using read cache 31A or 31B (RC #1 or RC #2), the controller 4 may store the valid data of physical set #2 in read cache 31A or 31B (RC #1 or RC #2) in advance before physical set #2 is set to a write permission mode.

Garbage collection (GC) is performed in the following procedure.

The controller 4 selects a plurality of free blocks corresponding to a plurality of VSSDs #1 to # n from the group of free blocks of physical set #2 currently set in a write permission mode (in other words, from a free block pool corresponding to physical set #2), and allocates the selected free blocks as GC copy destination blocks #1 to # n. GC copy destination block #1 is a block for storing the valid data of VSSD #1 copied from other blocks by GC. GC copy destination block #2 is a block for storing the valid data of VSSD #2 copied from other blocks by GC. Similarly, GC copy destination block # n is a block for storing the valid data of VSSD # n copied from other blocks by GC.

The controller 4 specifies some blocks (shared blocks) which belong to the physical set currently set in a write permission mode (here, physical set #2) and store a plurality of types of data corresponding to some VSSDs. The controller 4 selects the specified shared blocks as GC source blocks. The GC source blocks are blocks to which GC is applied. The GC source blocks may be also called GC target blocks.

The controller 4 copies the valid data for VSSD #1 in the shared blocks selected as GC source blocks to GC copy destination block #1 for VSSD #1. The controller 4 copies the valid data for VSSD #2 in the shared blocks selected as GC source blocks to GC copy destination block #2 for VSSD #2. Similarly, the controller 4 copies the valid data for VSSD # n in the shared blocks selected as GC source blocks to GC copy destination block # n for VSSD # n. In this way, a plurality of types of data corresponding to a plurality of VSSDs can be stored in different blocks. Thus, the plurality of types of data can be isolated from each other.

When a GC copy destination block is entirely filled with valid data, the GC copy destination block transitions to an active block and is managed by the active block pool of physical set #2. This active block contains only data corresponding to a specific VSSD. Thus, in the active block pool of physical set #2, the active block is managed as an unshared block. The controller 4 manages the group of active blocks containing only the data for VSSD #1 as the group of unshared blocks for VSSD #1, manages the group of active blocks containing only the data for VSSD #2 as the group of unshared blocks for VSSD #2 and manages the group of active blocks containing only the data for VSSD # n as the group of unshared blocks for VSSD # n. Normally, the data of some unshared blocks is partially invalidated by updating the data over time.

Now, this specification explains the reasons why plural types of data corresponding to plural VSSDs (in other words, a plurality of types of write data corresponding to a plurality of VSSDs) are written to the same write destination block.

Basically, to increase the efficiency of garbage collection, the data of the same VSSD (in other words, the data of the same end user) is preferably written to the same block. To realize this configuration, a large number of write destination blocks equal to the number of VSSDs (end users) need to be allocated. For example, when the number of VSSDs is 100 to 1000, the number of write destination blocks to be allocated is also 100 to 1000. In general, the amount of data writing differs depending on the VSSD (end user). Thus, the time points that the large number of write destination blocks are filled with data vary. For example, the following situation may occur. A write destination block is entirely filled with data, but data is hardly written to the other write destination blocks. This situation may complicate the process for moving a group of write destination blocks filled with data to an active block pool and the process for newly allocating a group of free blocks as a group of write destination blocks.

In the present embodiment, the controller 4 is capable of writing a plurality of types of data corresponding to a plurality of VSSDs to the same write destination block and subsequently separating the plurality of types of data by GC. Thus, it is possible to easily separate a plurality of types of data without complicating the process.

In GC, the controller 4 is capable of selecting an unshared block which contains both valid data and invalid data as a GC source block as well as a shared block.

In this case, the controller 4 selects the unshared block for VSSD #1 containing both valid data and invalid data from the active block pool of physical set #2 as a GC source block, and copies the valid data of the selected unshared block for VSSD #1 to GC copy destination block #1 for VSSD #1.

The controller 4 selects the unshared block for VSSD #2 containing both valid data and invalid data from the active block pool of physical set #2 as a GC source block, and copies the valid data of the selected unshared block for VSSD #2 to GC copy destination block #2 for VSSD #2.

The controller 4 selects the unshared block for VSSD # n containing both valid data and invalid data from the active block pool of physical set #2 as a GC source block, and copies the valid data of the selected unshared block for VSSD # n to GC copy destination block # n for VSSD # n.

In this way, even when a specific VSSD present in a group of shared blocks has relatively a small amount of valid data, the valid data related to the specific VSSD is copied to a GC copy destination block corresponding to the specific VSSD from the unshared block. Thus, the GC copy destination block corresponding to the specific VSSD can be entirely filled with the valid data of the specific VSSD. In this manner, the GC copy destination block can be entirely filled with valid data without writing dummy data to the GC copy destination block. This configuration can increase the efficiency of GC.

In GC, the controller 4 is also capable of using the blocks of the physical sets currently set in a read-only mode (here, physical sets #1 and #3) as GC source blocks. The controller 4 selects, as a GC source physical set, a physical set which is currently set in a read-only mode and has the number of rewrites (program/erase cycles) greater than that of physical set #2 currently set in a write permission mode. As the number of rewrites of a physical set, the total number of rewrites of the blocks belonging to the physical set may be used. The controller 4 copies a plurality of valid data portions corresponding to VSSDs #1 to # n, respectively, to GC copy destination blocks #1 to # n of physical set #2, respectively, from the selected GC source physical set. In this case, the controller 4 may select, as GC source blocks, some blocks containing both valid data and invalid data (for example, some shared blocks containing both valid data and invalid data and some unshared blocks containing both valid data and invalid data) from the active block pool of the GC source physical set. The controller 4 copies the valid data for VSSD #1 in each selected GC source block to GC copy destination block #1 for VSSD #1, copies the valid data for VSSD #2 in each selected GC source block to GC copy destination block #2 for VSSD #2, and copies the valid data for VSSD # n in each selected GC source block to GC copy destination block # n for VSSD # n.

In this way, for example, when the physical set currently set in a write permission mode is the physical set having the least number of program/erase cycles, GC can be performed by preferentially using free blocks in which the degree of wear is small (in other words, blocks to which few rewrites have been applied) in the physical set as the GC write destination blocks (GC copy destination blocks) for the VSSDs. As a result, it is possible to perform wear leveling among physical sets to level the wear of the physical sets.

Figure 22:
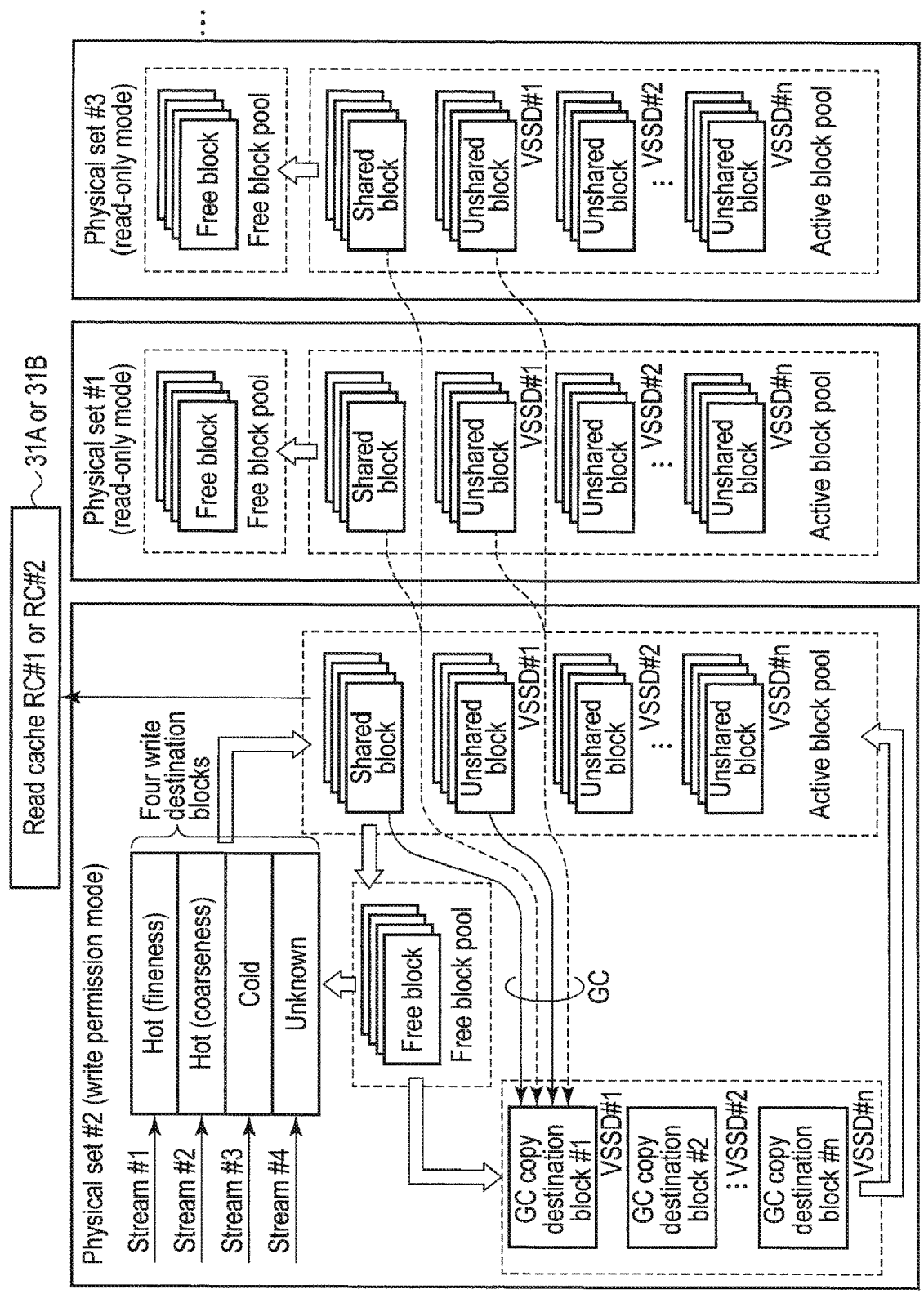
FIG. 22 illustrates an operation for wiring a plurality of types of data having different update frequencies to different blocks by using stream writing.

FIG. 22 illustrates an operation for writing a plurality of types of data having different update frequencies to different blocks by using stream writing.

Stream writing indicates an operation for writing different types of data associated with different streams to different blocks by writing the data associated with the same stream to the same block. A write request from the host 2 may include both the ID (NSID) of a namespace specifying a VSSD and the ID (stream ID) of a stream.

In the present embodiment, a plurality of types of data having different update frequencies are associated with different streams. In this case, the host 2 classifies the data to be written into one of a plurality of data types having different update frequencies. In the present embodiment, data types may include "Hot (fineness)", "Hot (coarseness)", "Cold" and "Unknown". "Hot (fineness)" indicates data which is frequently updated and has a small size. "Hot (coarseness)" indicates data which is frequently updated and has a larger size than the data of "Hot (fineness)". "Cold" indicates data which is not frequently updated or is hardly updated. "Unknown" is data in which the update frequency is unknown.

The controller 4 selects four free blocks from the group of free blocks of physical set #2 currently set in a write permission mode (in other words, from a free block pool corresponding to physical set #2), and allocates the selected four free blocks as write destination blocks.

The controller 4 writes the data to be written (write data) to one of the four write destination blocks in response to a write request from the host 2. When the received write request includes the stream ID of stream #1, write data ("Hot [fineness]" data) is written to a write destination block corresponding to stream #1. When the received write request includes the stream ID of stream #2, write data ("Hot [coarseness]" data) is written to a write destination block corresponding to stream #2. When the received write request includes the stream ID of stream #3, write data ("Cold" data) is written to a write destination block corresponding to stream #3. When the received write request includes the stream ID of stream #4, write data ("Unknown" data) is written to a write destination block corresponding to stream #4.

When these write destination blocks are filled with data, the write destination blocks transition to active blocks (here, shared blocks) and are managed in the active block pool. In this way, it is possible to prevent the same shared block from containing data having different update frequencies. This configuration can decrease the frequency of execution of garbage collection. As a result, the write amplification can be reduced. A block filled with only "Hot" data has a possibility that all the data in the block is invalided by updating the data. In this case, this block can be released as a free block without applying garbage collection to the block. A block filled with only "Cold" data probably contains only valid data for a long time. Thus, it is unnecessary to apply garbage collection to the block.

Figure 23:
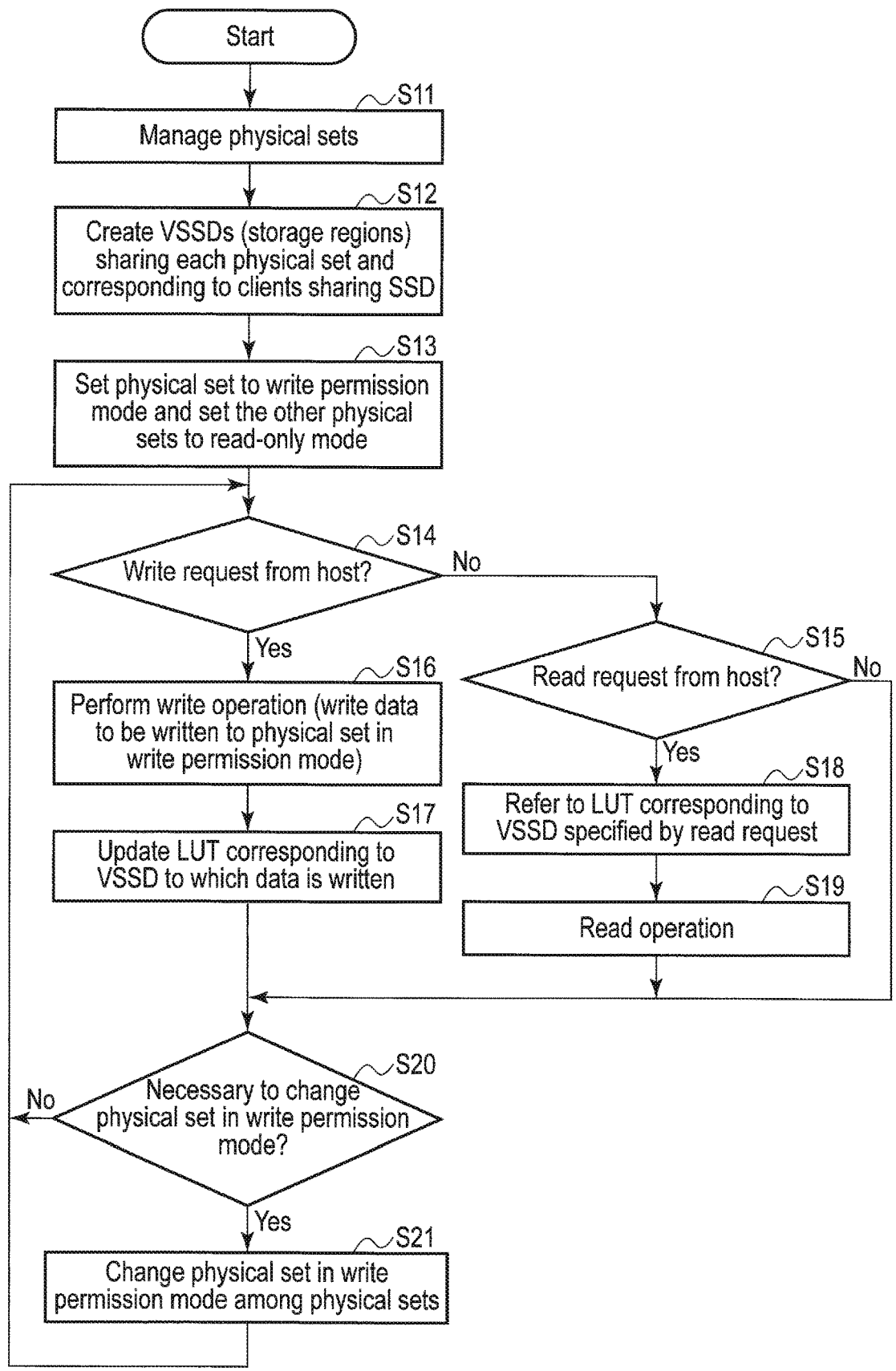
FIG. 23 is a flowchart illustrating an example of the procedure of a read/write process performed by the memory system according to the embodiment.

The flowchart of FIG. 23 illustrates an example of the procedure of a read/write process performed by the controller 4.

The controller 4 classifies thirty two NAND flash memory dies #1 to #32 into a plurality of physical sets such that each NAND flash memory die belongs to only one physical set. In this way, the controller 4 manages the physical sets (step S11). The controller 4 creates a plurality of VSSDs #1 to # n corresponding to a plurality of clients (end users) sharing the SSD 3 (step S12). Each of VSSDs #1 to # n spans a plurality of physical sets. VSSDs #1 to # n share each of a plurality of physical sets. The controller 4 sets a physical set to a write permission mode and sets each of the other physical sets to a read-only mode (step S13).

When the controller 4 receives a write request (write command) from the host 2 (YES in step S14), the controller 4 performs a write operation in response to the write request (step S16). The write request includes a VSSD specifying parameter specifying one of VSSDs #1 to # n. In step S16, the controller 4 writes the data to be written (write data) to the write destination block allocated from the group of free blocks of the physical set currently set in a write permission mode. The controller 4 updates a lookup table (LUT) corresponding to the VSSD to which the data is written (in other words, the VSSD specified by the VSSD specifying parameter), and maps the physical address indicating the physical storage location to which the data is written on the NAND flash memory 5 to a logical address corresponding to the data (step S17).

When the controller 4 receives a read request (read command) from the host 2 (YES in step S15), the controller 4 performs a read operation for reading the data to be read from one of a plurality of VSSDs in response to the read request (steps S18 and S19). The read request includes a VSSD specifying parameter. In step S18, the controller 4 refers to a lookup table (LUT) corresponding to the VSSD specified by the read request (in other words, the VSSD specified by the VSSD specifying parameter), and obtains the physical address mapped to the starting LBA included in the read request from the lookup table (LUT). In step S19, the controller 4 reads data from the physical storage location indicated by the physical address on the NAND flash memory 5, and returns the read data to the host 2.

The controller 4 determines whether or not the physical set in a write permission mode needs to be changed to another physical set (step S20). In step S20, the controller 4 may determine whether or not the above rotation condition is satisfied. In this case, when the rotation condition is satisfied, the controller 4 determines that the physical set in a write permission mode needs to be changed to another physical set (YES in step S20), and changes the physical set in a write permission mode to another physical set (step S21). In step S21, the controller 4 changes the physical set to be set to a write permission mode among a plurality of physical sets such that these physical sets are set to a write permission mode in turns. In other words, the controller 4 changes the physical set currently set in a write permission mode to a read-only mode and further changes one of the other physical sets currently set in a read-only mode to a write permission mode such that all the physical sets are set to a write permission mode in turns. In this way, the physical set to be set to a write permission mode is switched among a plurality of physical in rotation.

The flowchart of FIG. 24 illustrates another example of the procedure of a read/write process.

The controller 4 classifies thirty two NAND flash memory dies #1 to #32 into a plurality of physical sets such that each NAND flash memory die belongs to only one physical set. In this way, the controller 4 manages the physical sets (step S31). The controller 4 creates a plurality of VSSDs #1 to # n corresponding to a plurality of clients (end users) sharing the SSD 3 (step S32). Each of VSSDs #1 to # n spans a plurality of physical sets. VSSDs #1 to # n share each of a plurality of physical sets. The controller 4 sets a physical set to a write permission mode and sets each of the other physical sets to a read-only mode (step S33). The valid data of the physical set in a write permission mode is stored by the controller 4 in read cache 31A (RC #1) in advance.

When the controller 4 receives a write request (write command) from the host 2 (YES in step S34), the controller 4 performs a write operation in response to the write request (step S36). The write request includes a VSSD specifying parameter specifying one of VSSDs #1 to # n. In step S36, the controller 4 writes the data to be written (write data) to the write destination block allocated from the group of free blocks of the physical set currently set in a write permission mode. The controller 4 updates a lookup table (LUT) corresponding to the VSSD to which the data is written (in other words, the VSSD specified by the VSSD specifying parameter), and maps the physical address indicating the physical storage location to which the data is written on the NAND flash memory 5 to a logical address corresponding to the data (step S37).

When the controller 4 receives a read request (read command) from the host 2 (YES in step S35), the controller 4 performs a read operation for reading the data to be read from one of a plurality of VSSDs or read cache 31A (RC #1) in response to the read request (steps S39 to S42). The read request includes a VSSD specifying parameter.

In step S39, the controller 4 refers to a lookup table (LUT) corresponding to the VSSD specified by the read request (in other words, the VSSD specified by the VSSD specifying parameter), and obtains the physical address mapped to the starting LBA included in the read request from the lookup table (LUT). In step S40, based on the physical address, the controller 4 determines whether or not the physical set in which the data to be read is stored is the physical set currently set in a write permission mode, in other words, whether or not the physical storage location in which the data to be read is stored belongs to the physical set currently set in a write permission mode. When the physical set in which the data to be read is stored is the physical set currently set in a write permission mode (YES in step S40), the controller 4 reads the data to be read from read cache 31A (RC #1) and returns the read data to the host 2 in step S41. When the physical set in which the data to be read is stored is not the physical set currently set in a write permission mode (NO in step S40), the controller 4 reads data from the physical storage location indicated by the physical address, in other words, from the physical storage location in the physical set in a read-only mode and returns the read data to the host 2 in step S42.

In the background of the write/read process, the controller 4 performs a process for storing, in read cache 31B (RC #2), the valid data of the physical set to be subsequently set to a write permission mode (step S38).

The controller 4 determines whether or not the physical set in a write permission mode needs to be changed to another physical set (step S38). In step S38, the controller 4 may determine whether or not the above rotation condition is satisfied. In this case, when the rotation condition is satisfied, the controller 4 determines that the physical set in a write permission mode needs to be changed to another physical set (YES in step S43), and changes the physical set in a write permission mode to another physical set (step S44). In step S44, the controller 4 changes the physical set to be set to a write permission mode among a plurality of physical sets such that these physical sets are set to a write permission mode in turns. In other words, the controller 4 changes the physical set currently set in a write permission mode to a read-only mode and further changes one of the other physical sets currently set in a read-only mode (in other words, the physical set to be subsequently set to a write permission mode) to a write permission mode such that all the physical sets are set to a write permission mode in turns. In this manner, the physical set to be set to a write permission mode is switched among a plurality of physical sets in rotation.

The valid data of the physical set newly set in a write permission mode is stored in read cache 31B (RC #2). Thus, in step S41, data is read from read cache 31B (RC #2). In step S38, a process for storing, in read cache 31A (RC #1), the valid data of the physical set to be subsequently set to a write permission mode is performed.

Figure 25:
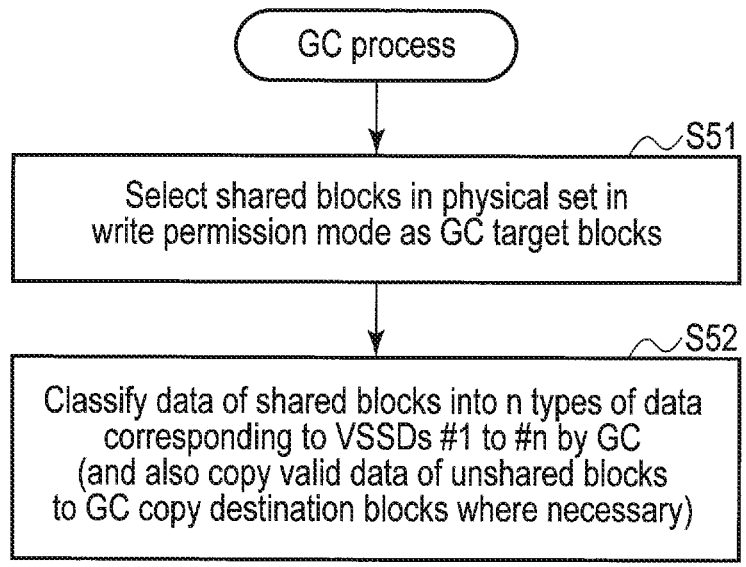
FIG. 25 is a flowchart illustrating the procedure of garbage collection (GC) performed by the memory system according to the embodiment.

The flowchart of FIG. 25 illustrates the procedure of garbage collection (GC).

The controller 4 selects some shared blocks of the physical set currently set in a write permission mode as GC target blocks (GC source blocks) (step S51). The controller 4 classifies the valid data of the selected shared blocks into n types of data corresponding to VSSD #1 to VSSD # n by applying GC to the GC target blocks (step S52). In step S52, the controller 4 (1) copies the valid data for VSSD #1 in each selected shared block to GC copy destination block #1 for VSSD #1 allocated from the group of free blocks of the physical set currently set in a write permission mode, (2) copies the valid data for VSSD #2 in each selected shared block to GC copy destination block #2 for VSSD #2 allocated from the group of free blocks of the physical set currently set in a write permission mode, and similarly, (3) copies the valid data for VSSD # n in each selected shared block to GC copy destination block # n for VSSD # n allocated from the group of free blocks of the physical set currently set in a write permission mode. The controller 4 may select some unshared blocks of the physical set currently set in a write permission mode as GC target blocks (GC source blocks). In this case, the valid data of each unshared block for VSSD #1 is copied to GC copy destination block #1 for VSSD #1. The valid data of each unshared block for VSSD #2 is copied to GC copy destination block #2 for VSSD #2. The valid data of each unshared block for VSSD # n is copied to GC copy destination block # n for VSSD # n.

Figure 26:
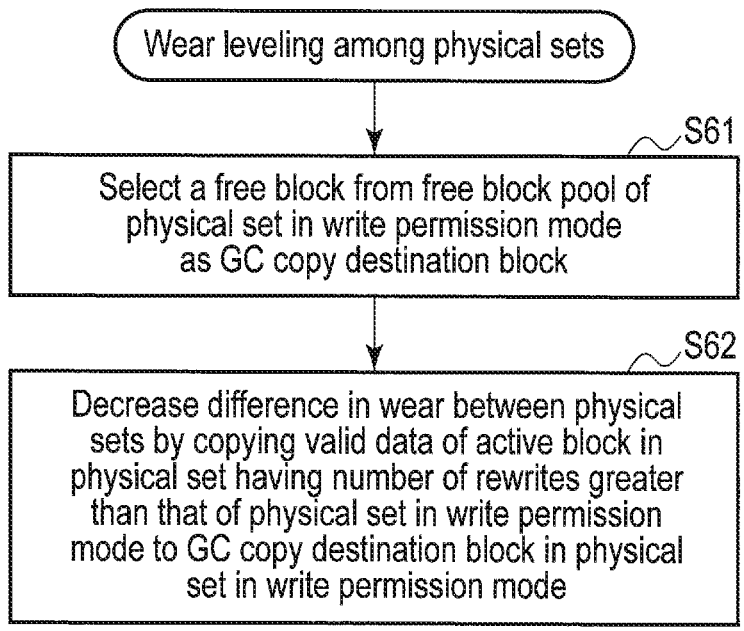
FIG. 26 is a flowchart illustrating the procedure of wear leveling among physical sets by the memory system according to the embodiment.

The flowchart of FIG. 26 illustrates the procedure of wear leveling among physical sets.

The controller 4 selects a free block from the free block pool of the physical set currently set in a write permission mode as a GC copy destination block (step S61). The controller 4 copies the valid data of an active block in a physical set having the number of rewrites greater than that of the physical set currently set in a write permission mode to the GC copy destination block in the physical set currently set in a write permission mode. In this way, the controller 4 reduces the difference in wear between these physical sets (step S62).

More specifically, in step S62, a physical set currently set in a read-only mode and having the number of rewrites (program/erase cycles) greater than that of the physical set currently set in a write permission mode is selected as a GC source physical set. A plurality of valid data portions corresponding to a plurality of VSSDs #1 to # n, respectively, are copied from the selected GC source physical set to GC copy destination blocks #1 to # n allocated from the group of free blocks of the physical set currently set in a write permission mode, respectively.

Figure 27:
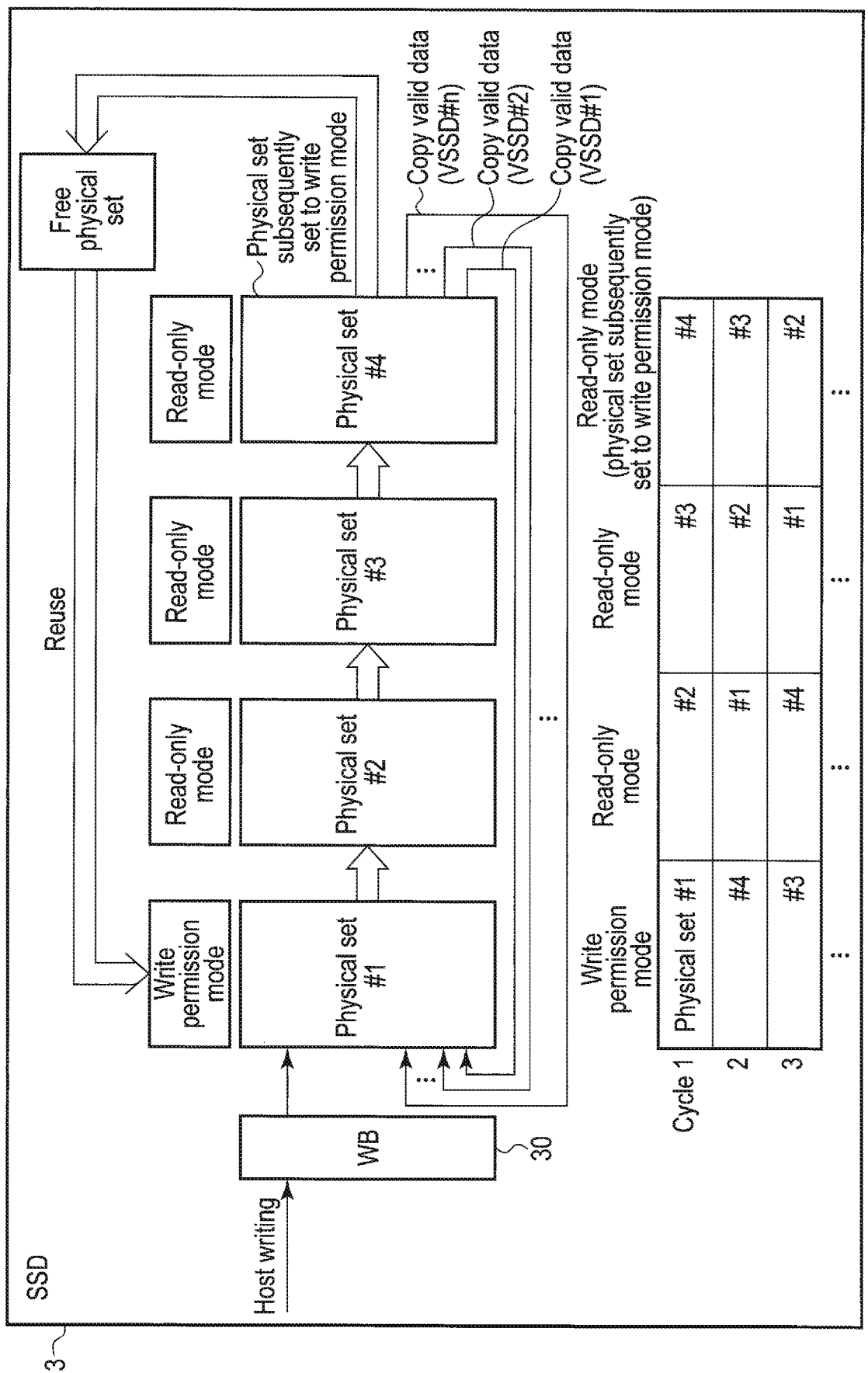
FIG. 27 is illustrated to explain an operation for copying all the valid data stored in the physical set to be subsequently set to a write permission mode to the physical set currently set in a write permission mode.

FIG. 27 illustrates an operation for copying all the valid data stored in the physical set to be subsequently set to a write permission mode to the physical set currently set in a write permission mode.

In cycle 1, physical set #1 is set to a write permission mode, and physical sets #2, #3 and #4 are set to a read-only mode. Physical set #4 is the physical set to be subsequently set to a write permission mode.

In cycle 1, write data from the host 2 is written to the write buffer (WB) 30. The write data is written from the write buffer (WB) to the write destination block in physical set #1. The write data written to the write buffer (WB) 30 is maintained in the write buffer (WB) 30 until cycle 1 ends. The data written from the host 2 to physical set #1 in cycle 1 can be read from the write buffer (WB) 30.

In cycle 1, all the valid data stored in physical set #4 is copied to physical set #1 currently set in a write permission mode. In this case, all the valid data for VSSD #1 stored in physical set #4 is copied to the group of GC copy destination blocks for VSSD #1 allocated from the group of free blocks of physical set #1. All the valid data for VSSD #2 stored in physical set #4 is copied to the group of GC copy destination blocks for VSSD #2 allocated from the group of free blocks of physical set #1. Similarly, all the valid data for VSSD # n stored in physical set #4 is copied to the group of GC copy destination blocks for VSSD # n allocated from the group of free blocks of physical set #1.

When a read request for reading data from physical set #4 is issued from the host 2 while valid data is copied, the data is read from physical set #4 instead of physical set #1. Thus, the possibility that read-on-write die contention occurs in physical set #1 because of the operation for copying valid data from physical set #4 to physical set #1 is not increased.

After all the valid data is copied, the controller 4 performs an erase operation to physical set #4 such that physical set #4 transitions to a free physical set which does not contain valid data, and sets physical set #4 to a write permission mode.

In cycle 2, physical set #4 is reused as the physical set in a write permission mode. Physical set #1 is set to a read-only mode. Physical set #3 is the physical set to be subsequently set to a write permission mode.

At the time of starting cycle 2, physical set #4 does not contain valid data. Thus, the possibility that physical set #4 becomes the read target can be reduced.

In cycle 2, write data from the host 2 is written to the write buffer (WB) 30. The write data is written from the write buffer (WB) 30 to the write destination block in physical set #4. The write data written to the write buffer (WB) 30 is maintained in the write buffer (WB) 30 until cycle 2 ends. Thus, the data written from the host 2 to physical set #4 in cycle 2 can be read from the write buffer (WB) 30.

In cycle 2, all the valid data stored in physical set #3 to be subsequently set to a write permission mode is copied to physical set #4 currently set in a write permission mode. In this case, all the valid data for VSSD #1 stored in physical set #3 is copied to the group of GC copy destination blocks for VSSD #1 allocated from the group of free blocks of physical set #4. All the valid data for VSSD #2 stored in physical set #3 is copied to the group of GC copy destination blocks for VSSD #2 allocated from the group of free blocks of physical set #4. Similarly, all the valid data for VSSD # n stored in physical set #3 is copied to the group of GC copy destination blocks for VSSD # n allocated from the group of free blocks of physical set #4.

When a read request for reading data from physical set #3 is issued from the host 2 while valid data is copied, the data is read from physical set #3 instead of physical set #4. Thus, the possibility that read-on-write die contention occurs in physical set #4 because of the operation for copying valid data from physical set #3 to physical set #4 is not increased.

After all the valid data is copied, the controller 4 performs an erase operation to physical set #3 such that physical set #3 transitions to a free physical set which does not contain valid data, and sets physical set #3 to a write permission mode.

In cycle 3, physical set #3 is reused as the physical set in a write permission mode. Physical set #4 is set to a read-only mode. Physical set #2 is the physical set to be subsequently set to a write permission mode.

Figure 28:
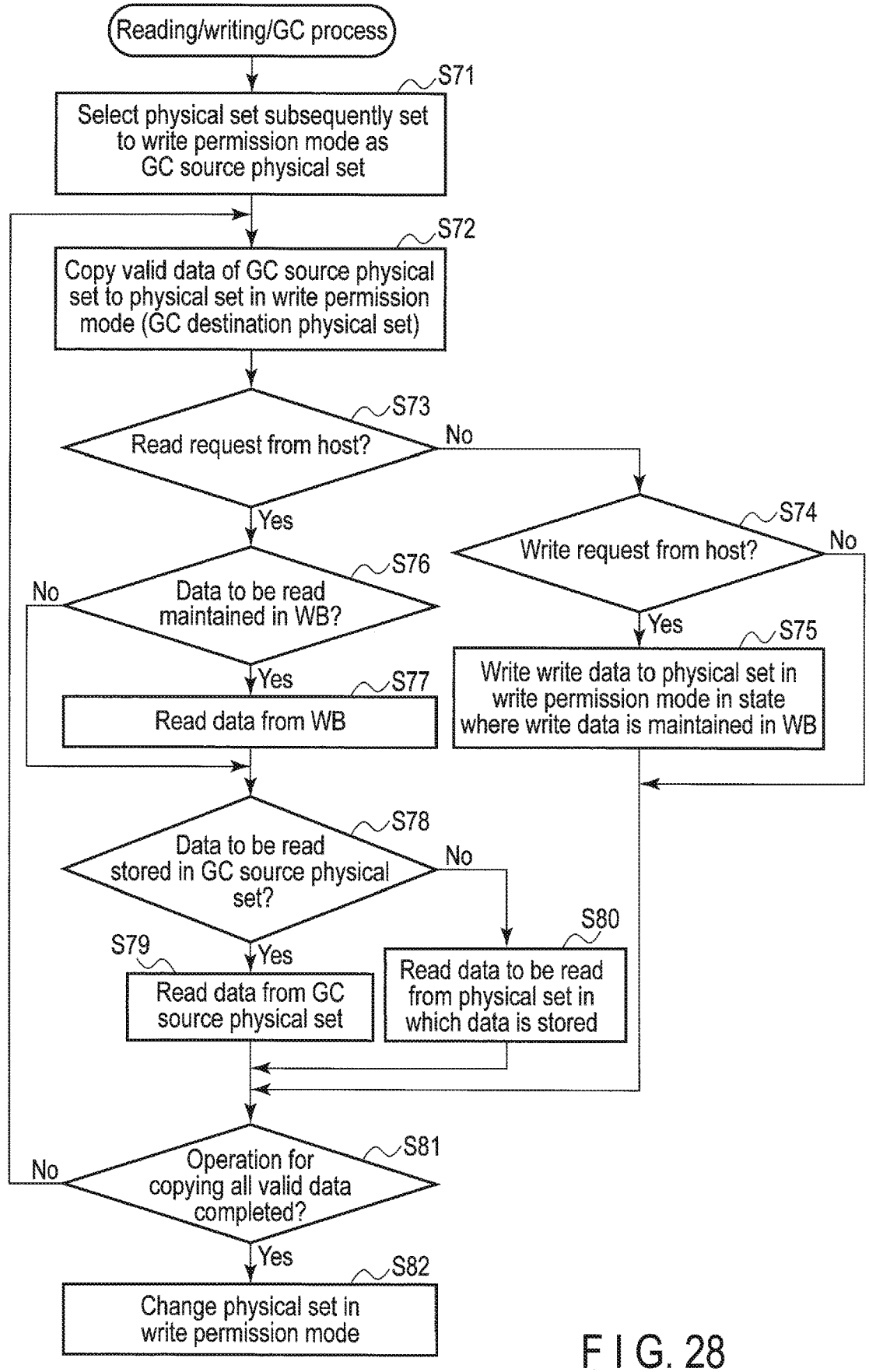
FIG. 28 is a flowchart illustrating the procedure of reading/writing/garbage collection (GC) performed by the memory system according to the embodiment.

The flowchart of FIG. 28 illustrates the procedure of reading/writing/garbage collection (GC).

The controller 4 selects the physical set to be subsequently set to a write permission mode as a GC source physical set (step S71). The controller 4 copies all the valid data of the GC source physical set to the physical set (GC destination physical set) currently set in a write permission mode (step S92).

The controller 4 determines whether the I/O request received from the host 2 is a read request or a write request (steps S73 and S74).

When the I/O request received from the host 2 is a write request (YES in step S74), the controller 4 writes the write data received from the host 2 to the write destination block in the physical set currently set in a write permission mode in a state where the write data is maintained (remains) in the write buffer (WB) 30 (step S75).

When the I/O request received from the host 2 is a read request (YES in step S73), the controller 4 determines whether or not the data to be read is maintained in the write buffer (WB) 30 (step S76).

When the data to be read is maintained in the write buffer (WB) (YES in step S76), the controller 4 reads the data to be read from the write buffer (WB) 30, and returns the read data to the host 2 (step S77).

When the data to be read is not maintained in the write buffer (WB) 30 (NO in step S76), the controller 4 determines whether or not the data to be read is the data stored in the GC source physical set (step S78).

When the data to be read is the data stored in the GC source physical set (YES in step S78), the controller 4 reads the data to be read from the GC source physical set and returns the read data to the host 2 (step S79).

When the data to be read is the data which is not stored in the GC source physical set (NO in step S78), the controller 4 reads the data to be read from the physical set in which the data to be read is stored, and returns the read data to the host 2 (step S80).

The controller 4 determines whether or not the operation for copying all the valid data stored in the GC source physical set is completed (step S81).

When the operation for copying all the valid data is not completed (NO in step S81), the controller 4 performs the process from step S72 again.

When the operation for copying all the valid data is completed (YES in step S81), the controller 4 changes the physical set in a write permission mode to another physical set (step S82). The process for changing the physical set in a write permission mode may be performed when the above rotation condition is satisfied. In step S82, the controller 4 changes the physical set currently set in a write permission mode to a read-only mode, and changes the physical set to be subsequently set to a write permission mode to a write permission mode.

FIG. 29 illustrates the content of a GC source physical set/GC destination physical set before copying data and the content of the GC source physical set/GC destination physical set after copying data.

The GC source physical set is the physical set to be subsequently set to a write permission mode. The GC destination physical set is the physical set currently set in a write permission mode.

As explained in FIG. 27, the present embodiment can perform a GC process (data copying process) for copying all the valid data stored in the physical set (GC source physical set) to be subsequently set to a write permission mode to the physical set (GC destination physical set) currently set in a write permission mode.

As shown in the left part of FIG. 29, before copying data, normally, the data (active data) stored in the GC source physical set contains both valid data and invalid data. The GC destination physical set is a free physical set which does not contain valid data immediately after the physical set is set to a write permission mode.

The controller 4 copies all the valid data stored in the GC source physical set to the GC destination physical set by applying a GC process (data copying process).

As shown in the right part of FIG. 29, after copying data, the GC source physical set is a free physical set which does not contain valid data. The GC destination physical set contains the valid data (Copied) copied from the GC source physical set. The GC destination physical set contains a free region having a capacity equivalent to the amount of invalid data of the GC source physical set. The free region can be used to write new data from the host 2.

Thus, the controller 4 may restrict the amount of data which can be written to the physical set (GC destination physical set) currently set in a write permission mode from the host 2 to the amount of invalid data (the amount of garbage) of the GC source physical set.

The total amount of invalid data of the GC source physical set is the sum of the amount of invalid data corresponding to VSSD #1, the amount of invalid data corresponding to VSSD #2, the amount of invalid data corresponding to VSSD #3, . . . , the amount of invalid data corresponding to VSSD # n. Thus, the controller 4 may restrict the amounts of write data which can be received from the host 2 by VSSD #1 to VSSD # n to the amounts of invalid data of VSSD #1 to VSSD # n of the GC source physical set, respectively.

The GC source physical set which has transitioned to a free physical set by a GC process (data copying process) is reused as the physical set (in other words, as a new GC destination physical set) in a write permission mode after an erase operation is performed to the GC source physical set.

Figure 30:
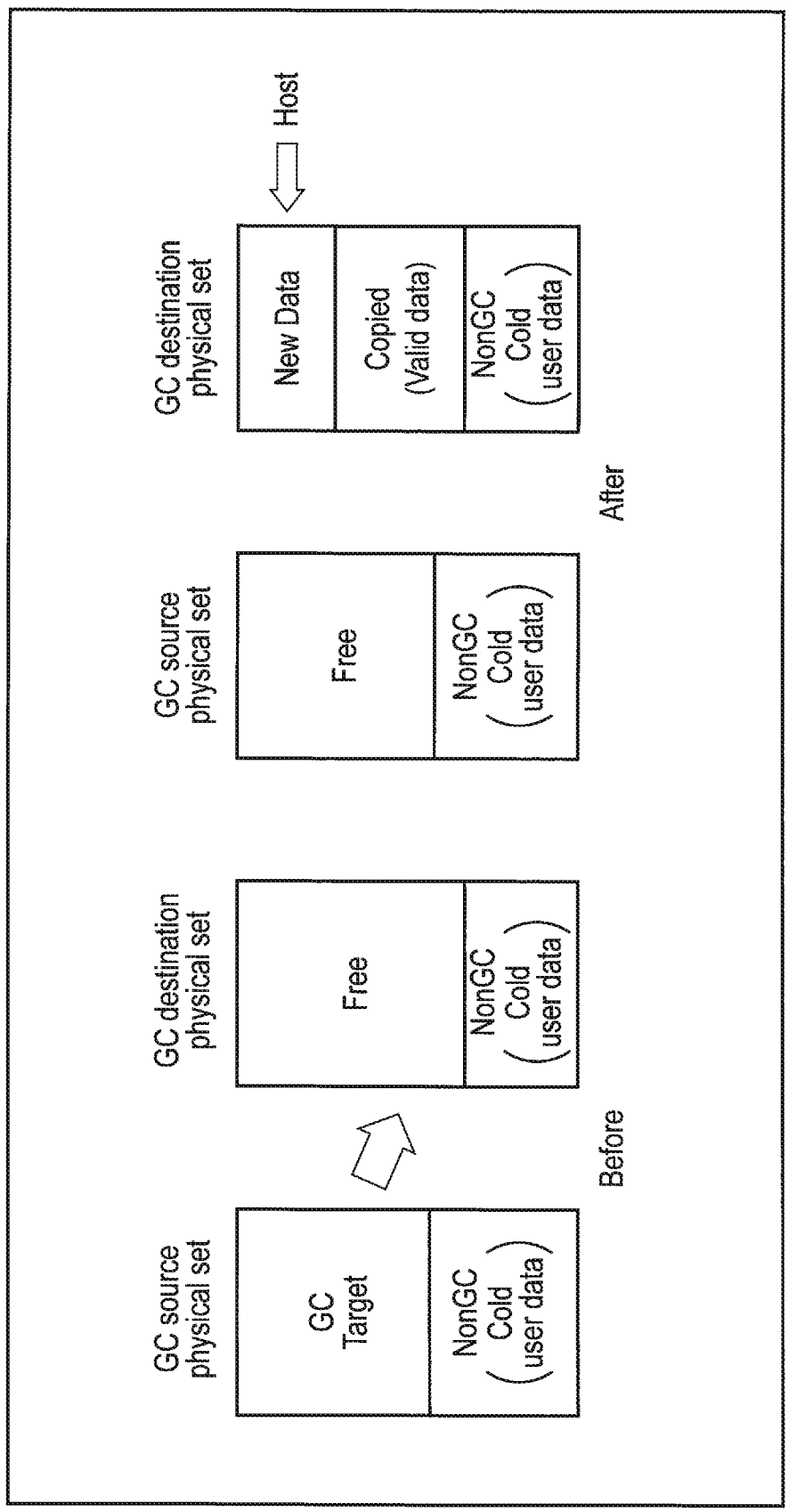
FIG. 30 illustrates the content of a GC source physical set/GC destination physical set before copying data and the content of the GC source physical set/GC destination physical set after copying data in a configuration using a read cache.

FIG. 30 illustrates the content of a GC source physical set/GC destination physical set before copying data and the content of the GC source physical set/GC destination physical set after copying data in a configuration using a read cache.

In a configuration using a read cache, of the group of active blocks of the GC source physical set, only a group of active blocks containing both valid data and invalid data can be the target for the GC process (data copying process).

As shown in the left part of FIG. 30, before copying data, the GC source physical set includes a GC target region (GC Target) and a non-GC target region (NonGC). The GC target region (GC Target) includes a group of active blocks containing both valid data and invalid data. The non-GC target region (NonGC) includes a group of active blocks mostly filled with only valid data (cold user data). The group of active blocks mostly filled with only valid data indicates blocks (cold user data blocks) in which the amount of valid data is greater than a threshold, in other words, blocks which hardly contribute to the creation of a free space even when GC is applied. For example, cold user data blocks may be blocks filled with cold user data (which may be simply referred to as cold data) having a low frequency of rewriting. The GC destination physical set includes a free region which does not contain valid data and a non-GC target region (NonGC) immediately after the physical set is set to a write permission mode.

The controller 4 copies only the valid data stored in the GC target region (GC Target) of the GC source physical set to the GC destination physical set.

As shown in the right part of FIG. 30, after copying data, the GC source physical set includes a free region which does not contain valid data and a non-GC target region (NonGC) which contains cold user data. The cold user data of the GC source physical set is stored in a read cache. The GC destination physical set includes cold user data (NonGC) and the valid data (Copied) copied from the GC source physical set. The GC destination physical set further includes a free region having a capacity equivalent to the amount of invalid data of the GC target region (GC Target) of the GC source physical set. The free region can be used to write new data from the host 2.

The controller 4 may restrict the amount of data which can be written to the physical set (GC destination physical set) currently set in a write permission mode from the host 2 to the amount of invalid data (the amount of garbage) of the GC target region (GC Target) of the GC source physical set. In this case, the controller 4 may restrict the amounts of write data which can be received from the host 2 by VSSD #1 to VSSD # n to the amounts of invalid data of VSSD #1 to VSSD # n of the GC target region (GC Target) of the GC source physical set, respectively.

The GC source physical set in which the free region has been increased by the GC process (data copying process) is reused as the physical set (as a new GC destination physical set) in a write permission mode after the erase operation of the free region is performed.

Figure 31:
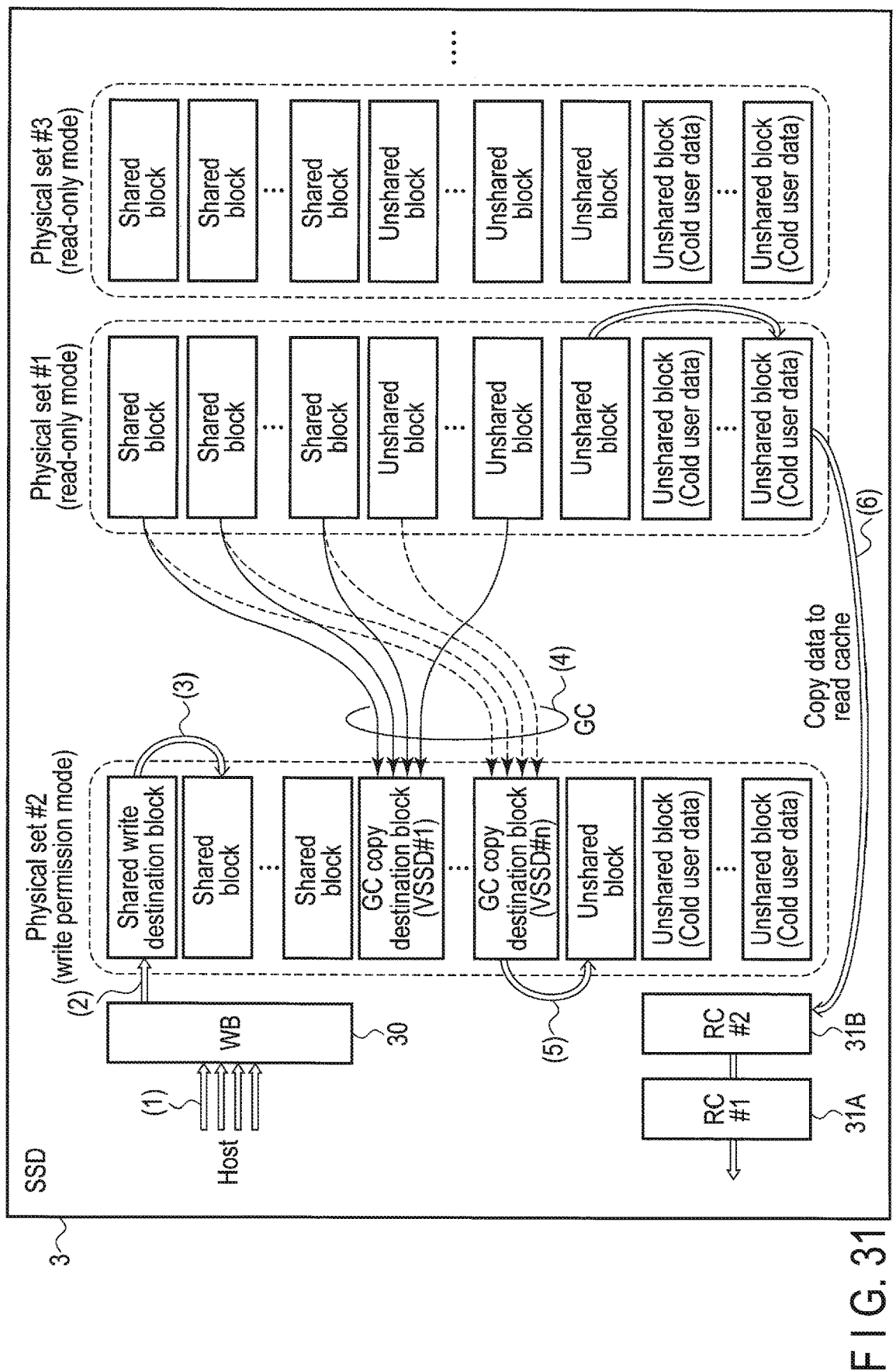
FIG. 31 is illustrated to explain the transition of the state of each block in each physical set.

FIG. 31 illustrates the transition of the state of each block of each physical set.

(1) The controller 4 writes the write data received from the host 2 (write data for VSSD #1, write data for VSSD #2, . . . , write data for VSSD # n) to the write buffer (WB) 30.

(2) The controller 4 writes the write data of the write buffer (WB) 30 to the write destination block (shared write destination block) in physical set #2 currently set in a write permission mode. The shared write destination block is the write destination block to which write data for VSSD #1, write data for VSSD #2, . . . , write data for VSSD # n should be written.

(3) When the shared write destination block is entirely filled with write data, the controller 4 moves the shared write destination block to the active block pool of physical set #2 and manages the shared write destination block as a shared block.

(4) The controller 4 performs GC. In the GC, the controller 4 copies a plurality of types of data corresponding to VSSD #1 to VSSD # n from a group of shared blocks to a plurality of GC copy destination blocks corresponding to VSSD #1 to VSSD # n, and isolates the plurality of types of data from each other. In the GC, the other physical sets in a read-only mode may be also the GC target. For example, the controller 4 copies the valid data of the GC target region (GC Target) of the physical set (here, physical set #1) to be subsequently set to a write permission mode to a plurality of GC copy destination blocks.

(5) When a GC copy destination block corresponding to a VSSD is filled with valid data, the controller 4 moves the GC copy destination block to the active block pool of physical set #2 and manages the GC copy destination block as an unshared block.

(6) The controller 4 performs a process for storing, in a read cache, the cold user data of the physical set (here, physical set #1) to be subsequently set to a write permission mode. The cold user data of physical set #2 is already present in read cache 31A (RC #1). Thus, the controller 4 stores the cold user data of physical set #1 in another read cache 31B (RC #2). The cold user data of physical set #1 may be also the GC target. In this case, the entire physical set #1 may transition to a free physical set. Thus, a process for storing cold user data in a read cache is unnecessary.

Figure 32:
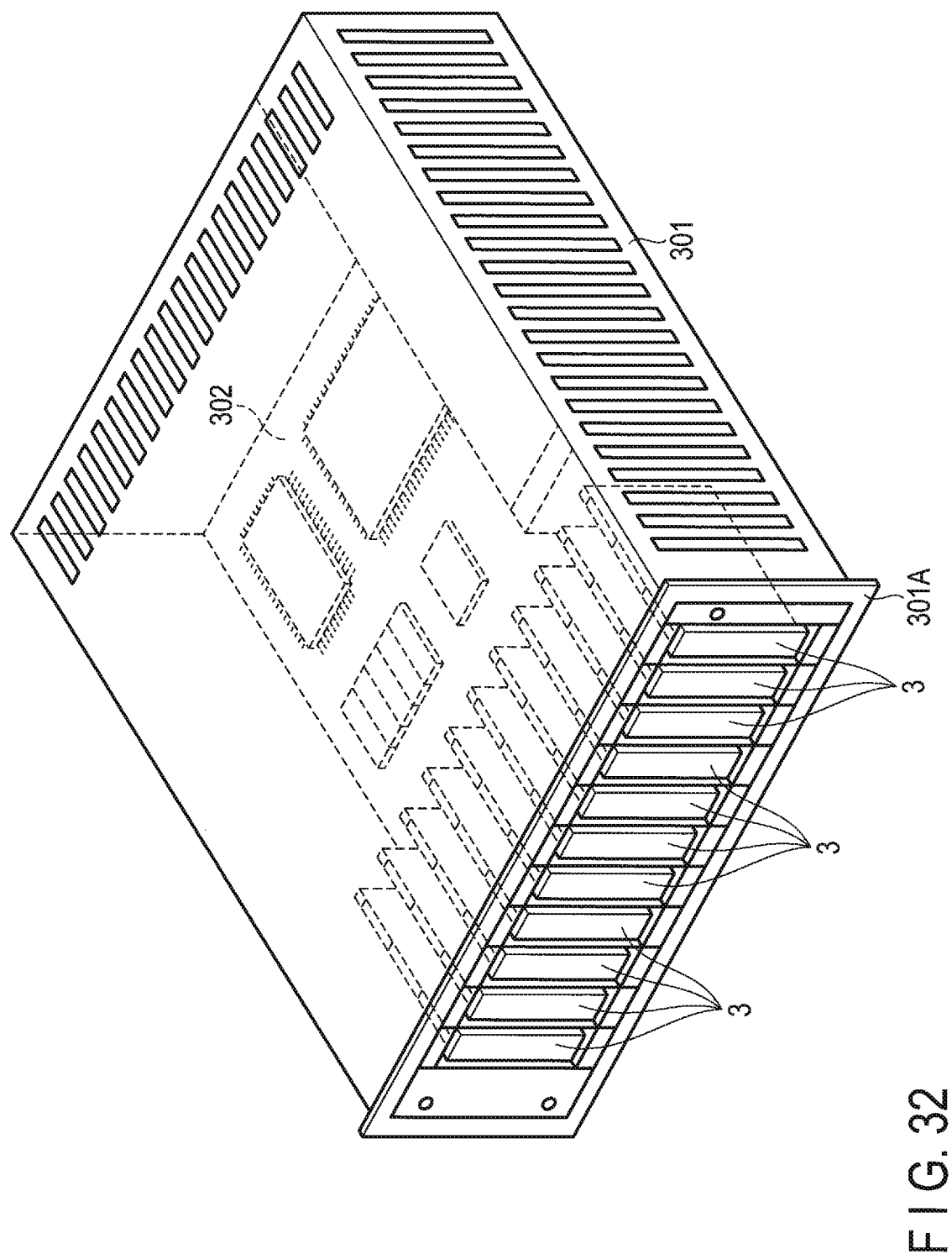
FIG. 32 illustrates a structural example of a computer on which a plurality of SSDs are mounted.

FIG. 32 illustrates a structural example of a computer (server) on which a plurality of SSDs are mounted.

The computer (data processing device) comprises a housing 301 which can be put into a rack and has a thin-box shape. A large number of SSDs 3 may be provided in the housing 301. In this case, each SSD 3 may be removably inserted into a corresponding slot provided in the front surface 301A of the housing 301. Each SSD 3 includes a large number of VSSDs, for example, a hundred to thousand VSSDs.

A system board (mother board) 302 is provided in the housing 301. On the system board (mother board) 302, various electronic components including a CPU, a memory and a network controller are mounted. These electronic components function as the host 2.

As explained above, in the present embodiment, a plurality of nonvolatile memory dies (for example, NAND flash memory dies) are classified into a plurality of physical sets such that each of the nonvolatile memory dies belongs to only one physical set. A plurality of storage regions (VSSDs) which share each of a plurality of physical sets and each of which spans a plurality of physical sets are created. One of a plurality of physical sets is set to a write permission mode (first mode) for permitting a write operation and a read operation. The other physical sets are set to a read-only mode (second mode) for permitting a read operation and prohibiting a write operation. A process for changing the physical set currently set in a write permission mode (first mode) to a read-only mode (second mode) and further changing one of the other physical sets currently set in a read-only mode (second mode) to a write permission mode (first mode) is performed such that all the physical sets are set to a write permission mode (first mode) in turns.

In a period, write data from the host 2 is always written to the specific physical set currently set in a write permission mode, and is not written to the physical sets currently set in a read-only mode. Thus, the possibility that read-on-write-die contention occurs can be limited to only the specific physical set currently set in a write permission mode. Since all the other remaining physical sets are in a read-only mode, data writing is not performed in any of the other remaining physical sets. Thus, read-on-write die contention does not occur in any of the other remaining physical sets. As a result, in the SSD 3 of the present embodiment, the possibility that read-on-write-die contention occurs can be reduced. In this way, it is possible to prevent the reduction in the I/O performance caused by access contention (read-only-write-die contention) among a plurality of end users (tenants) sharing the SSD 3.

In the present embodiment, each physical set is shared by a plurality of VSSDs. Further, the physical set to be set to a write permission mode is switched among a plurality of physical sets. Thus, regarding every storage region (every VSSD), data writing can be dispersed into a plurality of physical sets. In this way, the difference in wear (in other words, the difference in the number of program/erase cycles) between physical sets can be reduced. This configuration can maximize the life of the SSD 3.

The structure of the present embodiment may be applied to a storage system (storage array) including a plurality of SSDs such as NAS or an all-flash array.

In the present embodiment, a NAND flash memory is exemplarily shown as a nonvolatile memory. However, the function of the present embodiment may be applied to various other nonvolatile memories such as a magnetoresistive random access memory (MRAM), a phase change random access memory (PRAM), a resistive random access memory (ReRAM) or a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
    a nonvolatile memory including a plurality of nonvolatile memory dies; and
    a controller electrically connected to the nonvolatile memory and configured to:
    classify the nonvolatile memory dies into a plurality of physical sets such that each of the nonvolatile memory dies belongs to only one physical set;
    manage a plurality of storage regions which share each of the physical sets and each of which spans the physical sets; and
    set one of the physical sets to a first mode for permitting a write operation and a read operation, and set each of the other physical sets to a second mode for permitting a read operation and inhibiting a write operation.

2. The memory system of claim 1, wherein the controller is further configured to
    write data from the host to a write destination block allocated from a group of free blocks of the physical set currently set in the first mode in response to a write request from the host, wherein the write request includes a parameter specifying one of the storage regions.

3. The memory system of claim 2, wherein the controller is further configured to
    read data to be read from one of the storage regions in response to a read request from the host, wherein the read request includes a parameter specifying one of the storage regions.

4. The memory system of claim 3, wherein the controller is further configured to
    change the physical set in the first mode to the second mode and further change one of the other physical sets in the second mode to the first mode such that all the physical sets are set to the first mode in turns.

5. The memory system of claim 1, wherein the controller is further configured to:
    store, in a first read cache, valid data stored in a first physical set to be subsequently set to the first mode; and
    read, from the first read cache, data of the first physical set specified by a read request from the host while the first physical set is in the first mode.

6. The memory system of claim 5, wherein the controller is further configured to:
    store, in a second read cache, valid data stored in a second physical set to be set to the first mode subsequently to the first physical set while the first physical set is in the first mode, and
    read, from the second read cache, data of the second physical set specified by a read request from the host while the second physical set is in the first mode.

7. The memory system of claim 5, wherein the first read cache is implemented in a random access memory in the memory system.

8. The memory system of claim 6, wherein the first read cache and the second read cache are implemented in a random access memory in the memory system.

9. The memory system of claim 1, wherein the controller is further configured to:
copy all valid data stored in a first physical set to be subsequently set to the first mode to the physical set currently set in the first mode;
read first data from the first physical set when a read request for reading the first data of the first physical set is issued from the host during the operation for copying all the valid data; and
perform an erase operation to the first physical set after the operation for copying all the valid data is completed, change the physical set currently set in the first mode to the second mode and further change the first physical set subjected to the erase operation to the first mode such that all the physical sets are set to the first mode in turns.

10. The memory system of claim 1, wherein the controller is further configured to:
allocate a plurality of copy destination blocks corresponding to the storage regions from a group of free blocks of the physical set currently set in the first mode;
specify a block which belongs to the physical set currently set in the first mode and which stores a plurality of types of data corresponding to the storage regions; and
perform garbage collection for copying a plurality of valid data portions stored in the specified block and corresponding to the storage regions to the copy destination blocks, respectively.

11. The memory system of claim 1, wherein the controller is further configured to:
allocate a plurality of copy destination blocks corresponding to the storage regions from a group of free blocks of the physical set currently set in the first mode; and
perform garbage collection for copying a plurality of valid data portions corresponding to the storage regions to the copy destination blocks from another physical set currently set in the second mode and having the number of write operations greater than the number of write operations of the physical set currently set in the first mode.

12. A method of controlling a nonvolatile memory including a plurality of nonvolatile memory dies, the method comprising:
classifying the nonvolatile memory dies into a plurality of physical sets such that each of the nonvolatile memory dies belongs to only one physical set;
managing a plurality of storage regions which share each of the physical sets and each of which spans the physical sets; and
setting one of the physical sets to a first mode for permitting a write operation and a read operation, and setting each of the other physical sets to a second mode for permitting a read operation and inhibiting a write operation.

13. The method of claim 12, further comprising
writing data from a host to a write destination block allocated from a group of free blocks of the physical set currently set in the first mode in response to a write request from the host, wherein the write request includes a parameter specifying one of the storage regions.

14. The method of claim 13, further comprising
reading data to be read from one of the storage regions in response to a read request from the host, wherein the read request includes a parameter specifying one of the storage regions.

15. The method of claim 14, further comprising
changing the physical set currently set in the first mode to the second mode and further changing one of the other physical sets currently set in the second mode to the first mode such that all the physical sets are set to the first mode in turns.

16. The method of claim 12, further comprising:
storing, in a first read cache, valid data stored in a first physical set to be subsequently set to the first mode; and
reading, from the first read cache, data of the first physical set specified by a read request from the host while the first physical set is in the first mode.

17. The method of claim 12, further comprising:
copying all valid data stored in a first physical set to be subsequently set to the first mode to the physical set currently set in the first mode;
reading first data from the first physical set when a read request for reading the first data of the first physical set is issued from the host during the operation for copying all the valid data; and
performing an erase operation to the first physical set after the operation for copying all the valid data is completed, changing the physical set currently set in the first mode to the second mode and further changing the first physical set subjected to the erase operation to the first mode such that all the physical sets are set to the first mode in turns.

\* \* \* \* \*